(12) United States Patent  (10) Patent No.: US 7,681,532 B1
Deane  (45) Date of Patent: Mar. 23, 2010

(54) EXPANDABLE CARRIER FOR AN ANIMAL

(76) Inventor: Thomas Clarke Deane, P.O. Box 262, Redlands, CA (US) 92373

( * ) Notice: Subject to any disclaimer, the term of this patent is extended or adjusted under 35 U.S.C. 154(b) by 879 days.

(21) Appl. No.: 11/453,653

(22) Filed: Jun. 14, 2006

Related U.S. Application Data

(60) Provisional application No. 60/691,769, filed on Jun. 17, 2005.

(51) Int. Cl.
A01K 1/03 (2006.01)
A01K 1/02 (2006.01)

(52) U.S. Cl. .................... 119/473; 119/474; 119/498

(58) Field of Classification Search .............. 119/416, 119/417, 452, 453, 454, 455, 456, 458, 472, 119/473, 474, 475, 480, 481, 482, 484, 487, 119/491, 492, 494, 496, 497, 498, 499, 500, 119/501, 512, 513, 514, 751, 752; 220/8; D30/109, 108, 161, 118, 110; 190/21, 22, 190/14, 15 R, 104, 105, 133
See application file for complete search history.

(56) References Cited

U.S. PATENT DOCUMENTS

| | | | |
|---|---|---|---|
| 1,303,736 A | 5/1919 | Speicher | |
| 1,345,968 A * | 7/1920 | Speicher | 119/487 |
| 1,449,428 A | 3/1923 | McGaffee | |
| 3,791,347 A * | 2/1974 | Lovell | 119/497 |
| 4,140,080 A * | 2/1979 | Snader | 119/473 |
| 5,016,772 A | 5/1991 | Wilk | |
| 5,054,426 A | 10/1991 | Panarelli et al. | |
| 5,113,294 A | 5/1992 | Kim | |
| 5,558,041 A | 9/1996 | Fairall, Jr. et al. | |
| 5,671,697 A | 9/1997 | Rutman | |
| 5,960,744 A | 10/1999 | Rutman | |
| 6,131,534 A * | 10/2000 | Axelrod | 119/499 |
| 6,302,061 B1 | 10/2001 | Weatherby et al. | |
| D453,592 S | 2/2002 | Ross | |
| 6,408,797 B2 | 6/2002 | Pivonka et al. | |
| 6,427,631 B1 | 8/2002 | Ross | |
| 6,523,499 B1 | 2/2003 | Chrisco et al. | |
| 6,539,895 B2 | 4/2003 | Hoagland | |
| 6,694,918 B2 * | 2/2004 | Draft | 119/453 |
| 6,863,030 B2 | 3/2005 | Axelrod | |
| 7,201,116 B2 * | 4/2007 | Axelrod | 119/496 |
| 7,228,820 B1 * | 6/2007 | Kellogg et al. | 119/498 |

* cited by examiner

Primary Examiner—T. Nguyen
(74) Attorney, Agent, or Firm—Christie, Parker & Hale, LLP.

(57) ABSTRACT

A carrier for an animal providing expanded and collapsed configurations. The carrier may include an inner shell and an outer shell with respective openings that are co-positioned when the carrier is in the collapsed configuration. A moving wall may effectively block one of the openings when the carrier is in the expanded configuration.

19 Claims, 32 Drawing Sheets

EXPANDABLE CARRIER FOR AN ANIMAL

CROSS-REFERENCE TO RELATED APPLICATION(S)

This application claims the benefit of U.S. Provisional Application No. 60/691,769, filed Jun. 17, 2005, the disclosure of which is hereby incorporated by reference herein.

TECHNICAL FIELD

The application relates to animal transportation and confinement and, more specifically, to an expandable carrier for an animal.

BACKGROUND

Under typical industry practices, animal owners may purchase carriers that are "properly sized" to their animal. The term "properly sized" refers to the industry-wide accepted concept that confined animals should have enough room to stand up and turn around within a carrier. This typically results in an animal being confined within a carrier incorporating the smallest acceptable floor space for each class-size of animals. Furthermore, the floor space is typically rectangular in shape, forcing the confined "properly sized" animal to lie with its body parallel to the long axis of the carrier in either the prone/prostrate position or on its side with its legs retracted against its body. Stretching of the legs and body by the confined animal is usually accomplished by periodically standing and stretching within the confines of the carrier or during periodic bathroom breaks when it is let out of the carrier, only to return to the aforementioned resting positions within the carrier. Such confinement of a healthy animal during relatively short periods of time is generally not considered to be problematic.

However, confinement over relatively extended periods of time (e.g., overnight, animal shows, long-distance transportation, security/safety issues arising from interaction between the animal and an unfamiliar handler, etc.) within a "properly sized" carrier of healthy, recuperating animals, and/or breeder animals may significantly reduce the comfort, and in some cases the health, of the confined animal. In other words, periodic standing and stretching within the carrier as previously described may not be sufficient for the comfort of the animal.

The use of animal carriers for the transportation and confinement of small animals (e.g., cats, dogs, etc.) is well known. More specifically, animal carriers heretofore devised and utilized are known to consist basically of familiar structural configurations which have been developed for the fulfillment of various objectives and requirements. Examples of such carriers are disclosed in the following U.S. Patents:

U.S. Pat. No. 1,303,736; 5/1919 Speicher
U.S. Pat. No. 1,449,428; 3/1923 McGaffee
U.S. Pat. No. 5,016,772; 5/1991 Wilk
U.S. Pat. No. 5,054,426; 10/1991 Panarelli, et al
U.S. Pat. No. 5,558,041; 9/1996 Fairall, Jr. et al
U.S. Pat. No. 5,671,697; 9/1997 Rutman
U.S. Pat. No. 5,960,744; 10/1999 Rutman
U.S. Pat. No. 6,302,061 B1; 10/2001 Weatherby et al
U.S. Pat. No. 6,523,499 B1; 2/2002 Chrisco et al
U.S. Des. Pat. No. D453,592 S; 2/2002 Ross
U.S. Pat. No. 6,408,797 B2; 6/2002 Pivonka et al
U.S. Pat. No. 6,427,631 B1; 8/2002 Ross
U.S. Pat. No. 6,539,895 B2; 4/2003 Hoagland
U.S. Pat. No. 6,863,030 B2; Axelrod While these devices may fulfill their respective particular objectives and requirements, the aforementioned patents generally relate to animal carriers that are "properly sized" to the confined animal.

Several patents disclose expandable devices that may be used for animal transportation or confinement. For example, vertically-expanding devices are disclosed in U.S. Pat. No. 5,558,041 and U.S. Pat. No. 6,302,061. Devices that expand in a rectangular (front to back) manner are disclosed in U.S. Pat. No. 1,303,736, U.S. Pat. No. 1,449,428, U.S. Pat. No. 5,016,772, U.S. Pat. No. 5,054,426, U.S. Pat. No. 5,671,697 and U.S. Pat. No. 5,960,744. Devices that collapse for storage are disclosed in U.S. Pat. No. 6,408,797 B2 and U.S. Pat. No. 6,863,030 B2. Static non-collapsing non-expanding devices are disclosed in U.S. Pat. No. 6,523,499 B1, U.S. Pat. No. 6,427,631 B1, U.S. Pat. No. 6,539,895 B2 and U.S. Des. Pat. No. D453,592. These devices incorporate rectangular floor spaces.

SUMMARY

A summary of various aspects and/or embodiments of an apparatus constructed or a method practiced according to the invention follows. For convenience, an embodiment of an apparatus constructed or a method practiced according to the invention may be referred to herein simply as an "embodiment."

In one aspect the invention relates to animal enclosures, carriers and similar apparatuses. For convenience, these apparatuses may be referred to herein simply as carriers. Accordingly, it should be appreciated that a carrier as described herein is not necessarily directed to an apparatus in which an animal is "carried" from one place to another.

Some embodiments may address one or more of the problems of a conventional animal carrier by allowing the animal owner to significantly increase the floor space of the confined animal from a "properly sized" rectangular floor space to a larger more comfortable square floor space, allowing the animal to lie on its side and relax with its legs fully stretched out, at the animal's will. In addition, the carrier may be configured to allow the animal to lie prone/prostate, and periodically stand and stretch as in typical "properly sized" carriers. For example, animal comfort during extended confinement may be improved by expanding the typical rectangular floor space to a larger, more comfortable, square floor space.

Such an advantage may be achieved without purchasing and simultaneously transporting differently-sized carriers to supply a larger floor space, thus saving the consumer money and space. Some embodiments may allow for the inclusion of standard food and water bowls within a fully-expanded carrier without crowding the confined animal, thereby preventing unnecessary spills within the carrier. Moreover, additional space may be provided for the confined animal to move away from an accidental excretory deposit within the carrier.

Some embodiments are comprised of two opposing nested shells in which the inner shell telescopes sideways from within the outer shell. Here, the open end of the inner shell is configured to enable it to be inserted into the open end of the outer shell to define a continuous enclosed space within the nested shells. The carrier may thus be changed between a collapsed configuration and an expanded configuration by moving the shells relative to one another.

In some embodiments a co-positioned ingress/egress opening is provided in the front surface of each shell. In various embodiments, an internal swinging wall, an internal sliding articulated wall, an internal side-mounted roll-up articulated wall, or an internal center-mounted roll-up articulated wall may be incorporated at least partially within the inner shell to prevent accidental release of the confined animal through the opening in the front surface of the inner shell while the carrier is being expanded or collapsed. A security gate may be incorporated in the front surface of the outer shell to provide security for the confined animal.

In some embodiments a security gate may be located on a side surface of a shell (e.g., the outer shell). Such embodiment may not incorporate a co-positioned ingress/egress opening within the inner shell.

Applications of one or more of the embodiments may include, without limitation:

a carrier that can be used in the collapsed configuration for the confinement/transportation of animals under typical space-limited requirements such as loaded automobiles/RVs/trailers, loaded airline/marine cargo holds, small rooms, etc.;

a carrier that can be used in the expanded configuration for the confinement/transportation of animals under less-space-limited requirements such as partially loaded/unloaded automobiles/RVs/trailers, partially loaded/unloaded airline/marine cargo holds, large rooms, auditoriums, playgrounds, pet shows, etc.;

a carrier that can be used to provide a variable confinement floor space for breeding animals during periods of non-pregnancy, pregnancy, or nursing young, without the need to purchase multiple differently-sized carriers;

a carrier that can be used to provide a variable confinement floor space for healing animals requiring additional room following medical procedures including bone splinting, surgery, etc.;

a carrier that can be used to provide a variable confinement floor space for animals under periods of extended confinement that may require occasional "stretching" of limbs under certain circumstances that do not facilitate actual egress of animal (animal unfamiliar/frightened by handler/transporter or vice versa);

a carrier that can be used to provide a variable confinement floor space for animals under periods of extended confinement that require feeding through the use of the animal's familiar normal-sized feeding bowls with reduced accidental spillage while the animal re-positions itself; or a carrier that while it is positioned with its back against a room/corridor wall, can be expanded sideways parallel to the expected pattern of foot traffic, thus reducing possible injury that may occur by pathway obstruction or tripping.

These and other features, aspects and advantages of the invention will be more fully understood when considered with respect to the following detailed descriptions and accompanying drawings.

BRIEF DESCRIPTION OF THE DRAWINGS

FIG. 1, including

FIG. 7, including

FIG. 12, including

FIG. 19, including

FIG. 24, including

FIG. 28, including

Figure 1A:
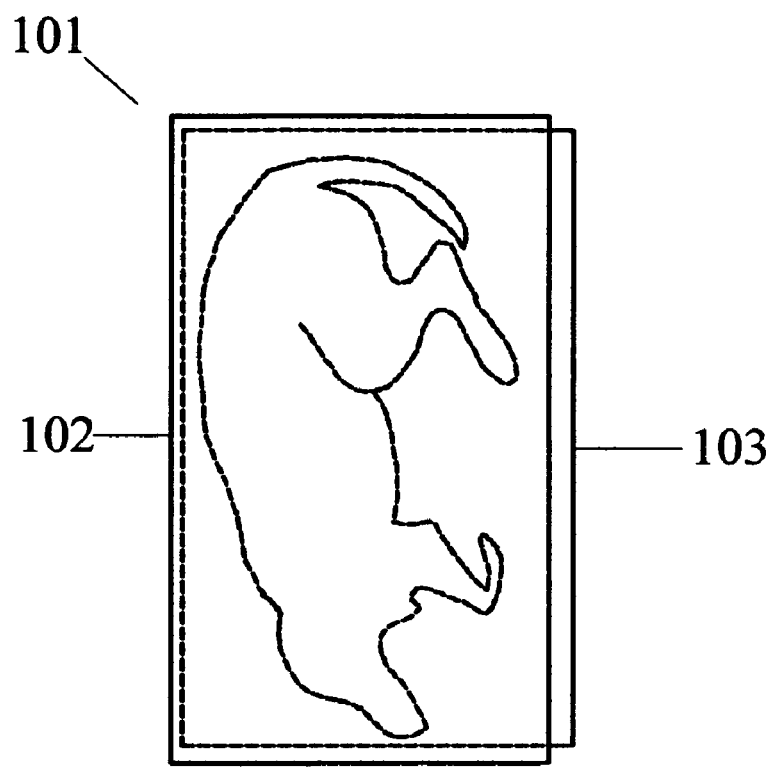
FIGS. 1A and 1B, is a simplified diagram showing a top view of one embodiment of a carrier in a collapsed configuration (FIG. 1A) and an expanded configuration (FIG. 1B)

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals may be used to denote like features throughout the specification and figures.

DETAILED DESCRIPTION

The invention is described below, with reference to detailed illustrative embodiments. It will be apparent that the invention may be embodied in a wide variety of forms, some of which may be quite different from those of the disclosed embodiments. Consequently, the specific structural and/or functional details disclosed herein are merely representative and do not limit the scope of the invention. For example, based on the teachings herein one skilled in the art should appreciate that the various structural and/or functional details disclosed herein may be incorporated in an embodiment independently of any other structural and/or functional details. Thus, an apparatus may be implemented and/or a method practiced using any number of the structural and/or functional details set forth in any of the disclosed embodiment(s). Also, an apparatus may be implemented and/or a method practiced using other structural and/or functional details in addition to or other than the structural and/or functional details set forth in any disclosed embodiment(s). Accordingly, references to "an" or "one" embodiment in this discussion are not necessarily to the same embodiment, and such references mean at least one embodiment.

In some aspects, the invention relates to an animal carrier that is expandable and/or components of the animal carrier. In some embodiments an animal carrier is configurable to expand sideways to create a larger floor space that may be more comfortable for an animal. For example, a carrier may expand from a configuration with a rectangular footprint to a configuration with a larger, squarer footprint.

In some embodiments the carrier includes two opposing nested shells configured such that the inner shell may slide within the outer shell. The carrier may thus be configured between a collapsed configuration and an expanded configuration by moving the shells relative to one another.

In some embodiments ingress/egress openings provided on (e.g., defined within) corresponding surfaces (e.g., the front surfaces) of the shells are co-positioned to permit ingress/egress in the collapsed configuration. The carrier may incorporate a movable member that blocks at least a portion of the opening in the inner shell when the carrier is in an expanded or partially expanded configuration.

For convenience, various aspects that may be incorporated into an animal carrier will be discussed in conjunction with embodiments which may be referred to as embodiments 1, 2, 3, 4, and 5. Each of these embodiments will be discussed in turn with the description of embodiment 1 describing various aspects of a carrier in relative detail and the descriptions of the remaining embodiments focusing on differences and/or additional details of those embodiments.

Embodiment 1

Figure 1B:
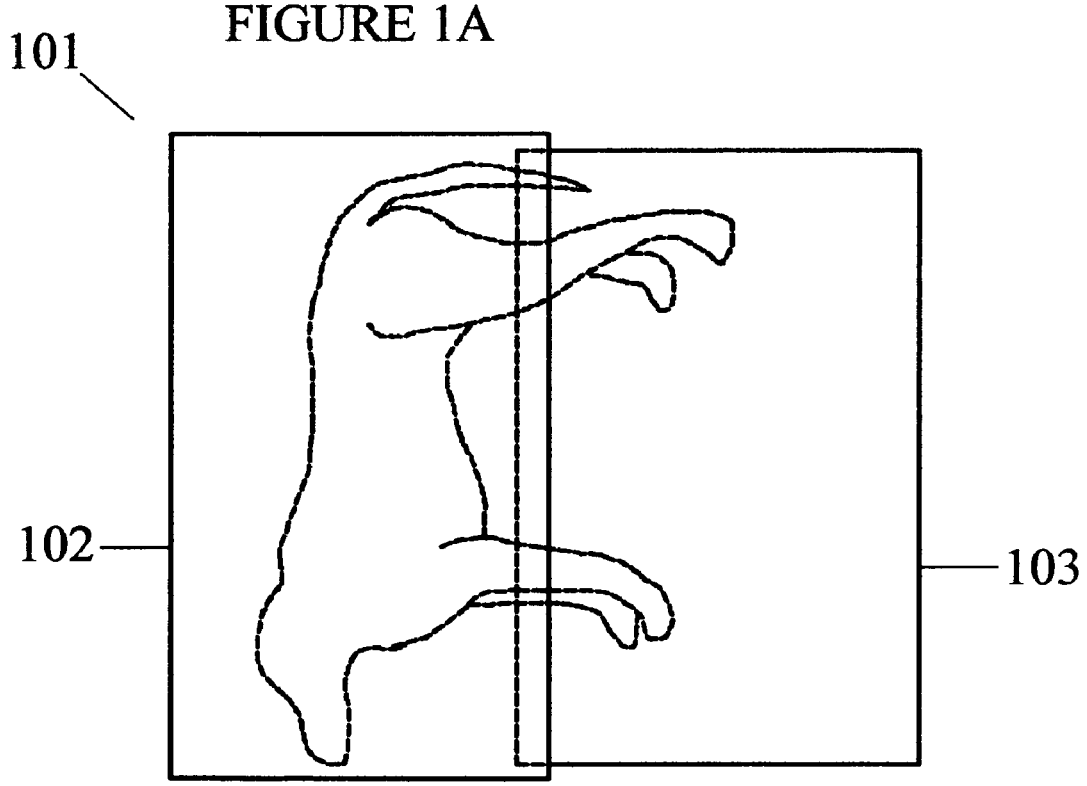

With reference now to FIGS. 1 through 11, an embodiment of an animal carrier 101 will be described in which a moving internal member (e.g., a wall) is used to prevent escape of an animal through an opening in a surface (e.g., a front surface) of an inner shell. FIG. 1 shows a top conceptual view of the carrier 101 depicting an animal within the carrier 101. FIG. 1A illustrates a collapsed configuration of the carrier 101. FIG. 1B illustrates an expanded configuration of the carrier 101. The animal carrier 101 is configured to expand sideways through the use of two opposing nested shells: an outer shell 102 and an inner shell 103. Each shell includes the following surfaces: a top, a bottom, a front, a back, and one side. Each shell lacks one side surface (or has a relatively small profile side surface) on the side that faces the other shell, leaving an open space that facilitates sideways expansion through a telescoping action.

In the collapsed configuration shown in FIG. 1A, the outer shell 102 contributes one side, the top, the bottom, the front, and the back outer surfaces of the carrier 101. The inner shell 103 contributes the remaining side to confine the animal.

In the expanded configuration shown in FIG. 1B, the outer shell 102 contributes a side, part of the top, part of the bottom, part of the front, and part of the back surfaces, and the inner shell 103 contributes the remaining side, the remaining part of the top, the remaining part of the bottom, the remaining part of the front, and the remaining part of the back surfaces to confine the animal.

FIGS. 2, 3, 4, and 5 show the carrier 101 from front, rear, non-expanding side (outer shell 103), and expanding side (inner shell 102) perspectives, respectively. Additional details that may be incorporated into the animal carrier 101 will be discussed in conjunction with these figures.

Figure 2:
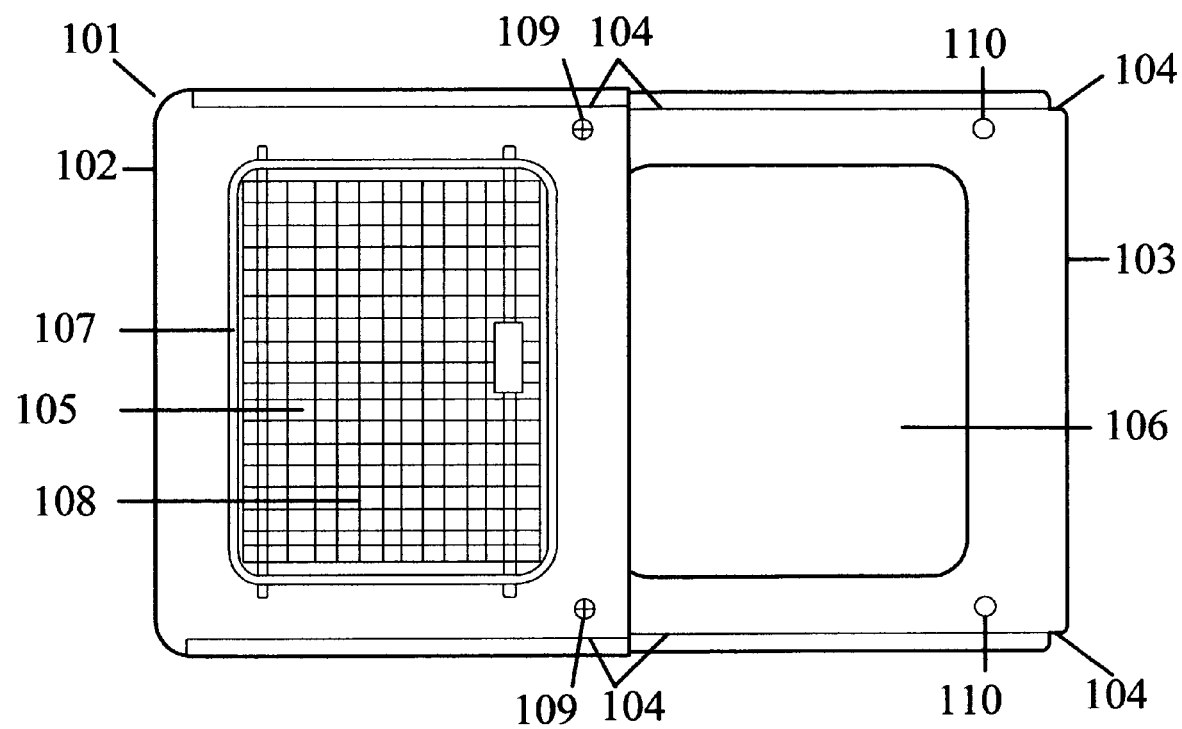
FIG. 2 is a simplified diagram showing a front view of one embodiment of a carrier in an expanded configuration.
Figure 3:
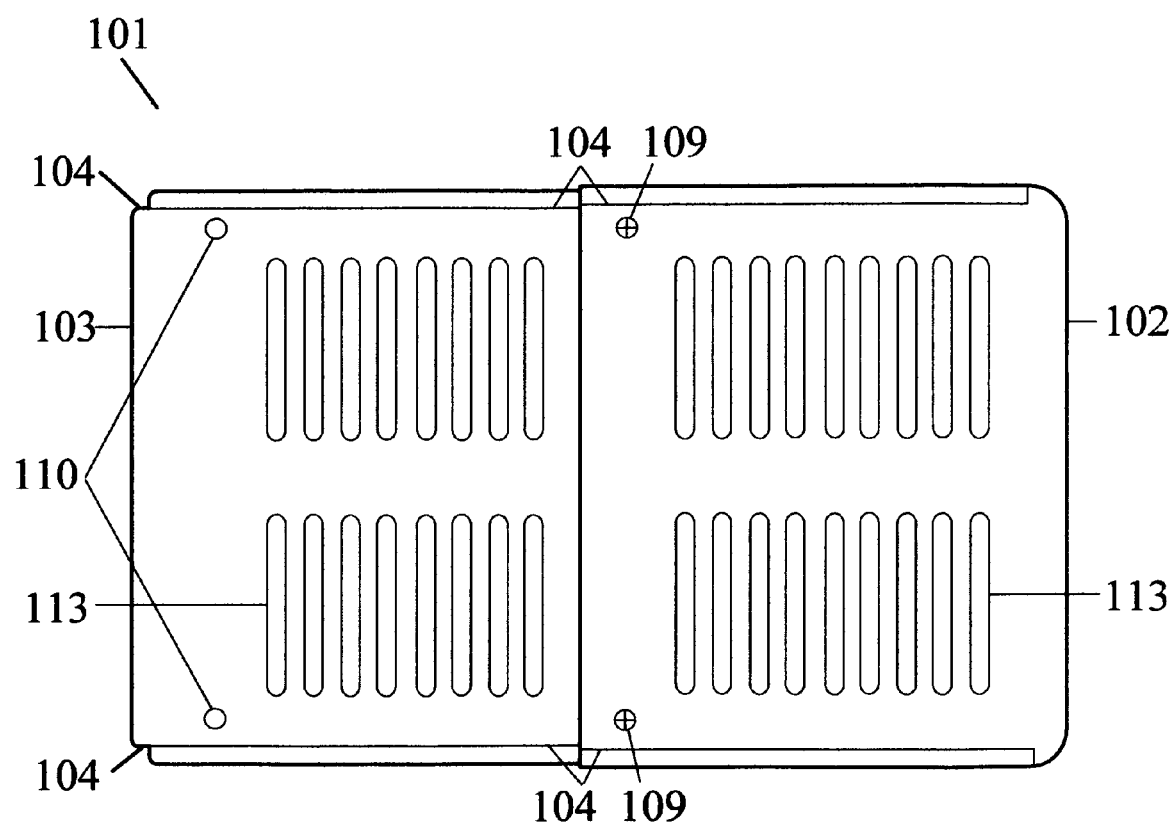
FIG. 3 is a simplified diagram showing a rear view of one embodiment of a carrier in an expanded configuration.
Figure 4:
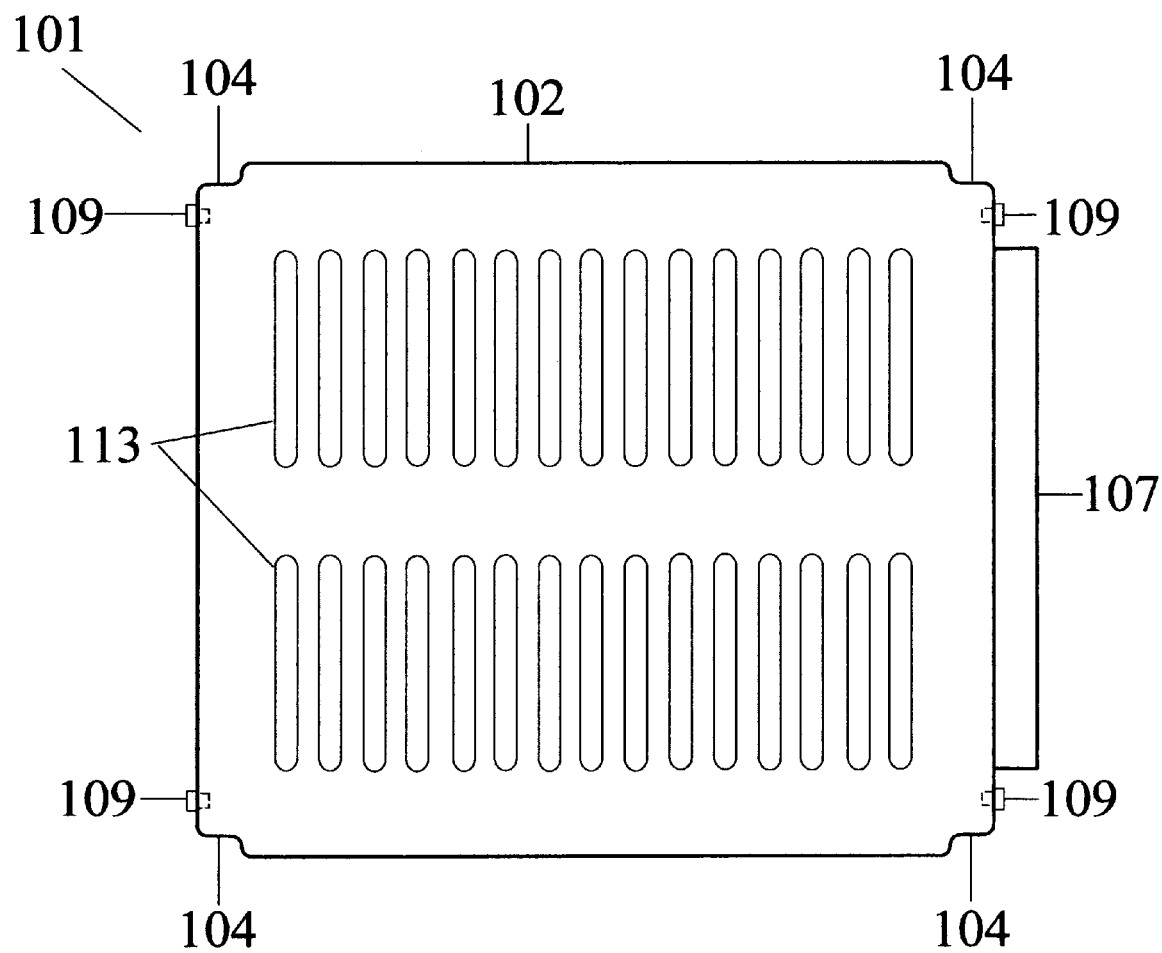
FIG. 4 is a simplified diagram showing a non-expanding side view of one embodiment of a carrier.
Figure 5:
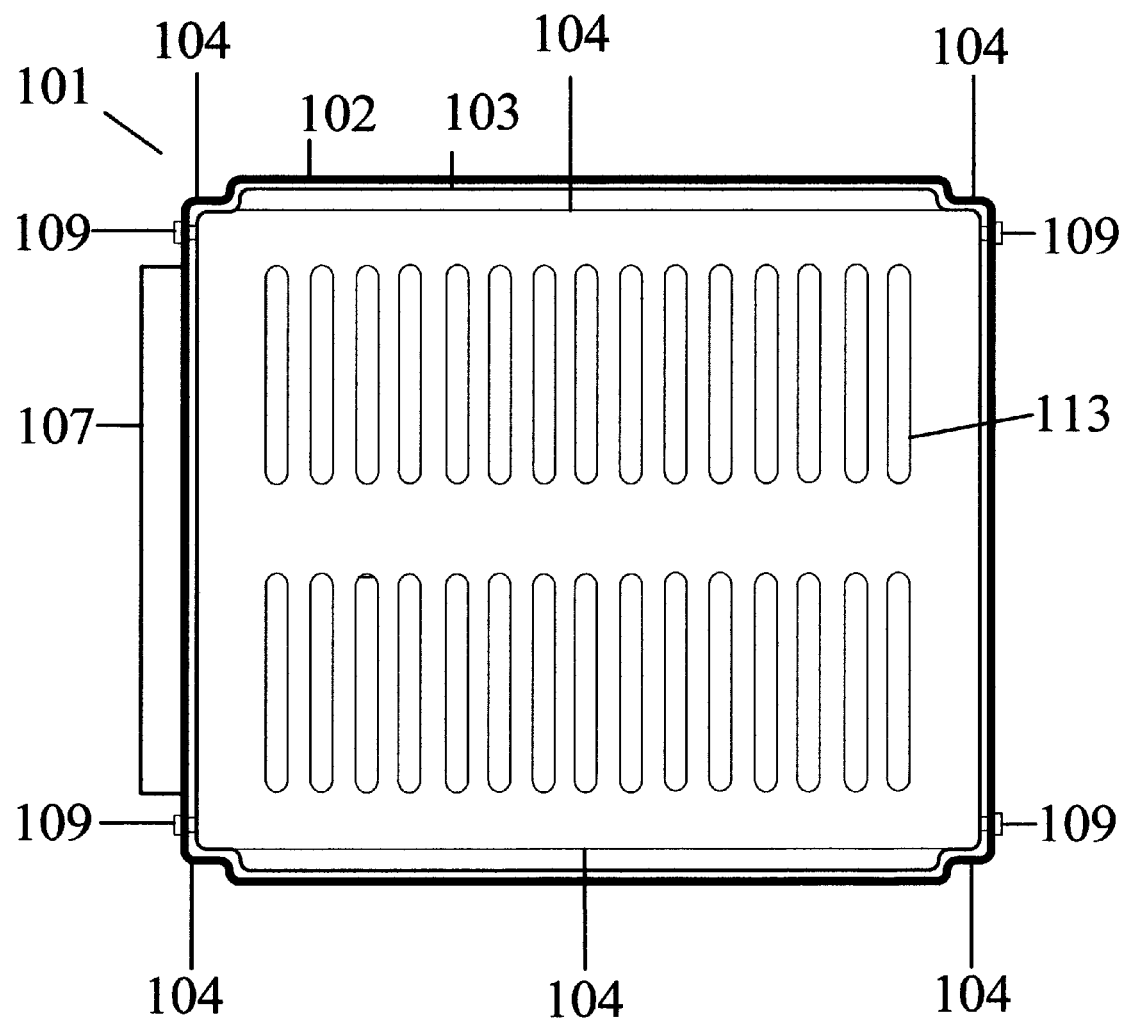
FIG. 5 is a simplified diagram showing an expanding side view of one embodiment of a carrier.

In some embodiments recessed structural shoulders 104 are incorporated into the shells 102 and 103. As shown in FIGS. 2, 3 and 5, the shoulders 104 may be located along the front and back edges of the top and bottom surfaces of both shells 102 and 103. In some embodiments (e.g., as shown in FIGS. 2-5) the shoulders 104 also may wrap around the side edges of the top and bottom surfaces of the inner shell 103. It should be appreciated that one or more of the structural shoulders 104 may not be incorporated into some embodiments.

The geometry of the structural shoulders 104 of the inner shell 103 are such that they approximate the geometry of the corresponding structural shoulders 104 of the outer shell 102. See, for example, the relative positions and shapes of the shoulders 104 of outer shell 102 and inner shell 103 in FIG. 5. As a result, the interactions of the shoulders 104 provide sliding surfaces that facilitate telescoping of the shells 102, 103 without binding. See, for example, at the corners in FIG.

5, the inner surface of the shoulder 104 on the outer shell 102 mating with the outer surface of the shoulder 104 on the inner shell 103.

The front surface of each shell 102, 103 includes openings, each of which is of sufficient size and co-positioned with the opening of the other shell to facilitate unobstructed ingress/egress of an animal when the carrier is in a collapsed configuration. For example, the front surface of the outer shell 102 includes an opening 105 and the front surface of the inner shell 103 includes an opening 106. When the carrier 101 is in a collapsed configuration, the opening 105 may line up with (i.e., be co-positioned with) the opening 106 to allow ingress/egress through the combined opening. When the carrier 101 is in an expanded configuration, controlled ingress/egress of an animal may be accomplished through one of the openings (e.g., opening 105). For example, in some embodiments the front surface of the outer shell 102 includes a cowling 107 that surrounds opening 105 and supports a security gate 108 to control ingress/egress of the animal.

The carrier 101 may include one or more locks to prevent accidental expanding and collapsing of the carrier 101. For example, as shown in FIGS. 2 and 3 four locks 109 may be located in upper and lower corners of the front and back surfaces of the outer shell 102. These locks 109 protrude inward through corresponding lock holes 110 in the inner shell 103. In one embodiment, a total of eight lock holes 110 are provided near the corners of the front and rear surfaces of the inner shell 103 such that the carrier 101 may be securely locked in either a collapsed configuration or an expanded configuration.

In some embodiments other provisions are made to prevent the inner shell 103 from exiting the outer shell 102 when the carrier is fully expanded. For example, interlocking stops may be incorporated into the shells. In some embodiments the stops are incorporated into the spaces that separate (e.g., vertically separate) the structural shoulders 104 located on the top and bottom surfaces of both shells 102 and 103.

Figure 6:
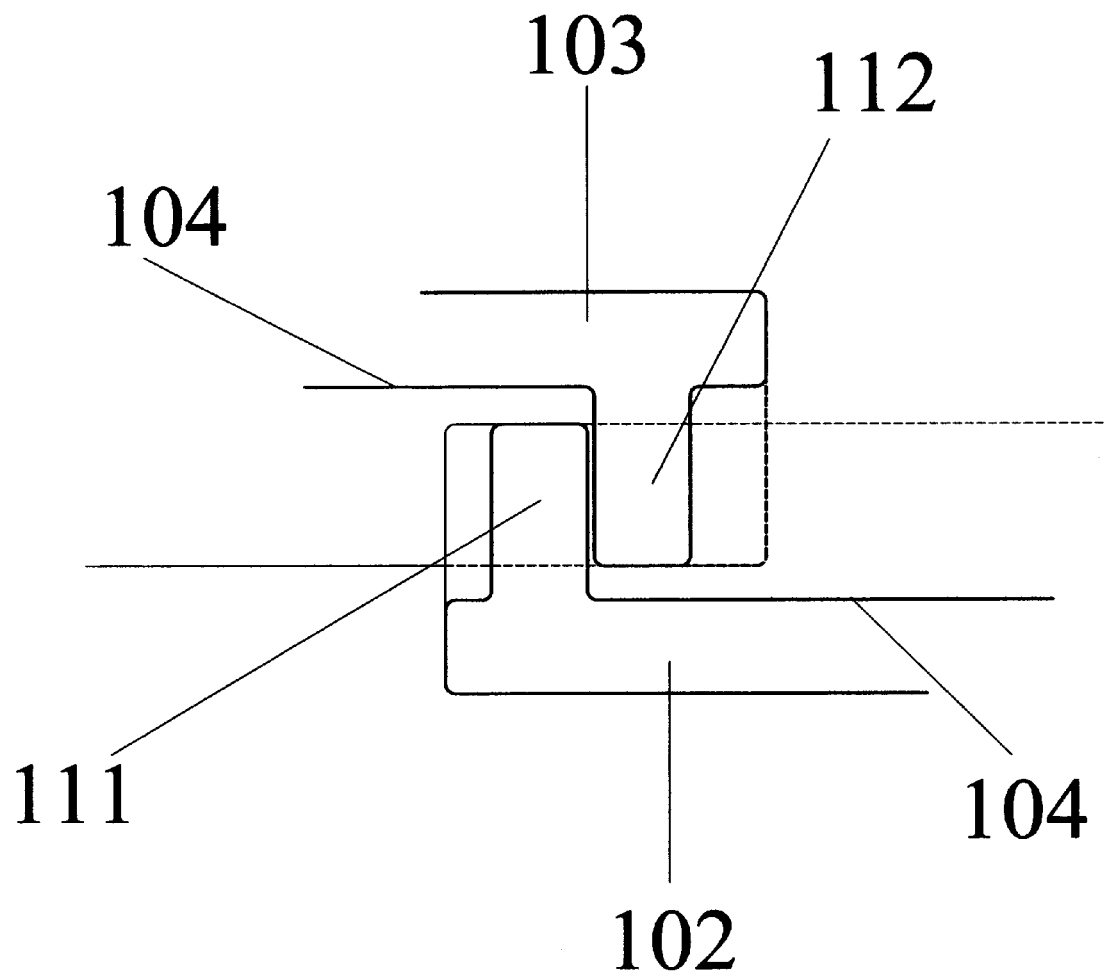
FIG. 6 is a simplified diagram of one embodiment of front and rear stops that may prevent an inner shell from exiting a front or rear portion of an outer shell when a carrier is in an expanded configuration.

In some embodiments the stops may be used to prevent the rear portion of the inner shell 103 from exiting the rear portion of the outer shell 102 when the carrier is fully expanded while other provisions may be made to prevent a similar action at the front of the shells. Referring to FIG. 6, two stops 111 extend inward from the inner surfaces of the rear structural shoulders 104 of the outer shell 102, near the open end of the shell 102. Two stops 112 extend outward from the outer surfaces of the rear structural shoulders 104 of the inner shell 103, near the open end of the shell 103. Only one set of stops is shown in the view of FIG. 6 which depicts shoulders 104 on the bottom of the shells 102 and 103. Here, the stops 111 extend upward from shell 102 and the stops 112 extend downward from shell 103. When the carrier 101 is in an expanded configuration, the stops 111 incorporated into the outer shell 102 contact the stops 112 incorporated into the inner shell 103, preventing further expansion.

Additionally, the side and back surfaces of both shells 102 and 103 may contain any type, number or arrangement of ventilators 113 (e.g., holes formed in the shells). When the carrier 101 is in a collapsed configuration, the ventilators 113 of the shells, if incorporated into the carrier 101, may be co-positioned such that air-flow restriction is minimized between overlapping shells. It should be appreciated that ventilators 113 that may be used are not limited to the type, number and locations shown.

Various provisions may be made to prevent an animal from escaping through an opening (e.g., the opening 106 in the inner shell 103) when the carrier 101 is in an expanded or partially expanded configuration. In some embodiments the carrier 101 may incorporate a moving member that serves to block off the opening 106 when the carrier 101 is not in the collapsed configuration. When the carrier 101 is in the collapsed configuration, the member moves to a position that does not block the openings 105 and 106.

Figure 7A:
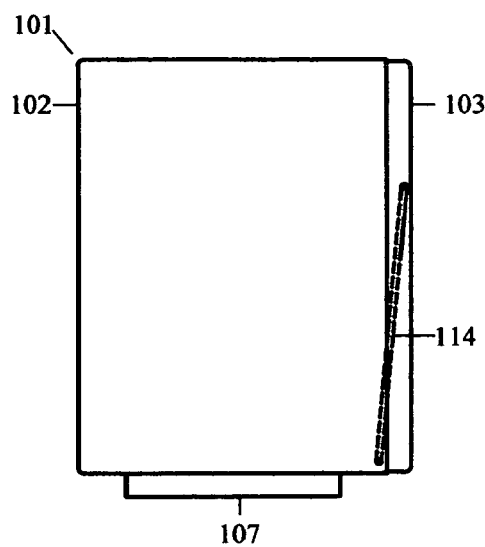
FIGS. 7A, 7B and 7C, is a simplified diagram showing a top view of one embodiment of a carrier in a collapsed configuration (FIG. 7A), an intermediary configuration (FIG. 7B), and an expanded configuration (FIG. 7C)
Figure 7B:
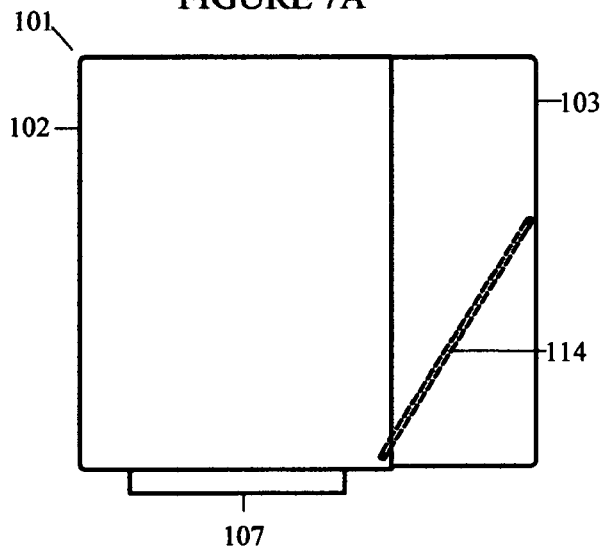
Figure 7C:
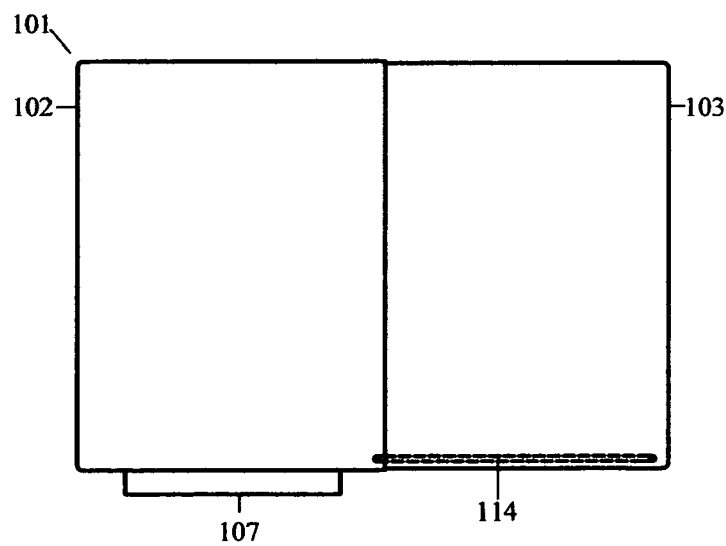

FIG. 7 conceptually depicts, from a vertical perspective, one embodiment of the action of a moving (e.g., via sliding, swinging or some other motion) wall 114. FIG. 7A depicts the position of the wall 114 when the carrier 101 is in a collapsed configuration. FIG. 7B depicts the position of the wall 114 when the carrier 101 is in an intermediary configuration. FIG. 7C depicts the position of the wall 114 when the carrier 101 is in a fully expanded configuration. The moving wall may take a variety of forms. For example, the moving wall may be a unitary wall, a sectioned wall or take some other form.

Figure 8:
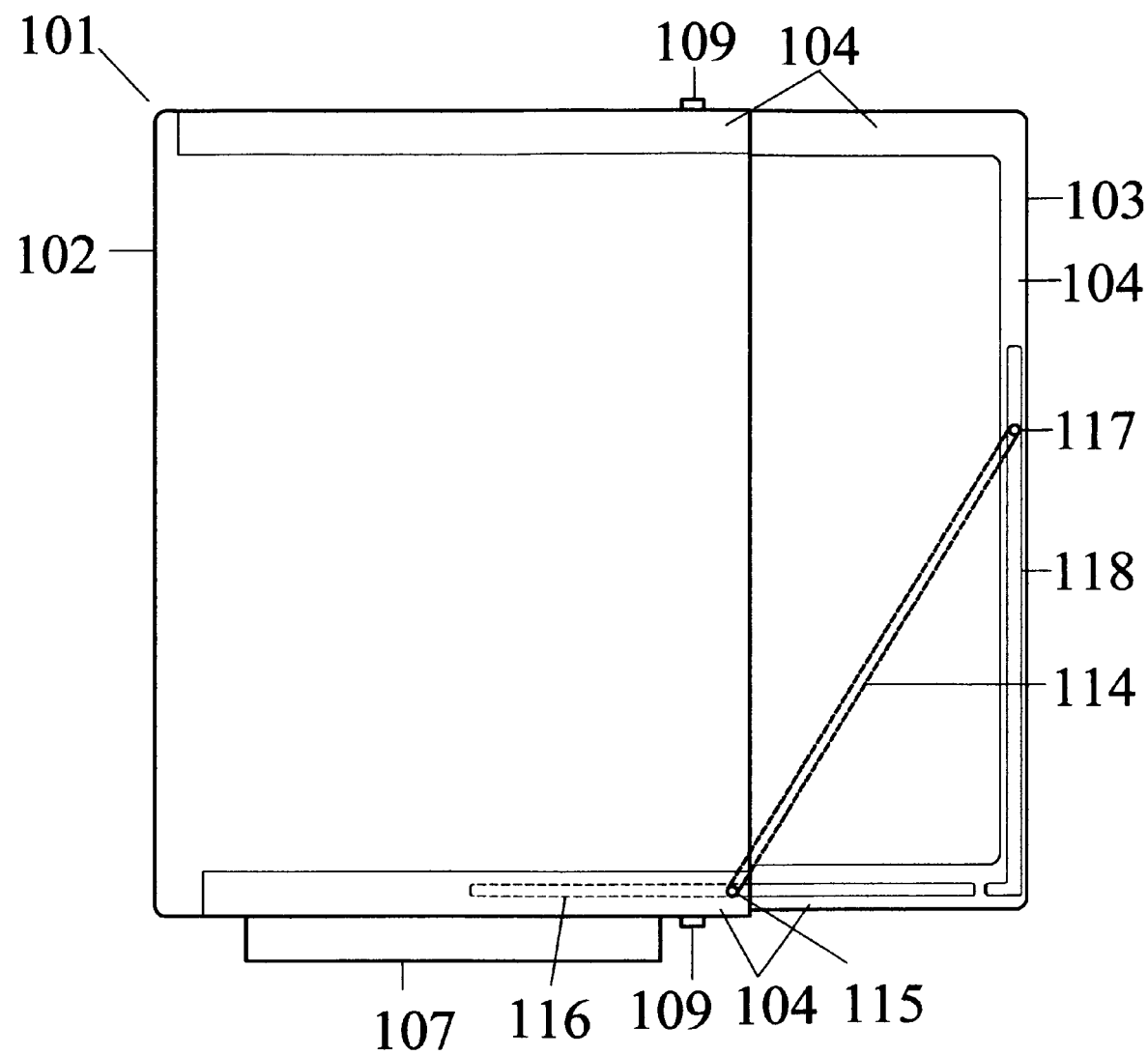
FIG. 8 is a simplified diagram showing a top view of one embodiment of a carrier in an intermediary configuration.

FIG. 8 illustrates one embodiment of a swinging wall 114 in relation to the carrier 101 from a vertical perspective. The swinging wall 114 includes a stationary end that pivots around a stationary axis 115. Axis 115 is anchored within holes formed on or within the upper and lower front shoulders 104 of outer shell 102. Thus, a member of the wall (e.g., the axis 115) may be rotatably coupled to a stationary member of the outer shell 102. In some embodiments the axis 115 protrudes through straight slots 116 (e.g., channels, guides or similar structures) provided on or within the front shoulders 104 of inner shell 103 to allow the shell 103 to slide past the axis 115 in a relatively unobstructed manner.

The wall 114 includes a sliding axis 117 that extends vertically upward and downward through L-shaped slots 118 (e.g., channels, guides or similar structures) provided on or within the shoulders 104 at the side (the closed end) of the inner shell 103. Thus, a member of the wall (e.g., the axis 117) may be slidably coupled to the inner shell 103. The slots 118 are arranged such that the longer and shorter dimensions of each slot are aligned parallel to the side and front surfaces of the inner shell 103, respectively. In FIG. 8, the long dimension is shown as the vertical portion of the slot 118 and the short dimension is shown as the horizontal portion of the slot 118. Alternatively, slots 118 may be replaced with outwardly-raised integral channels of similar dimensions.

Figure 9:
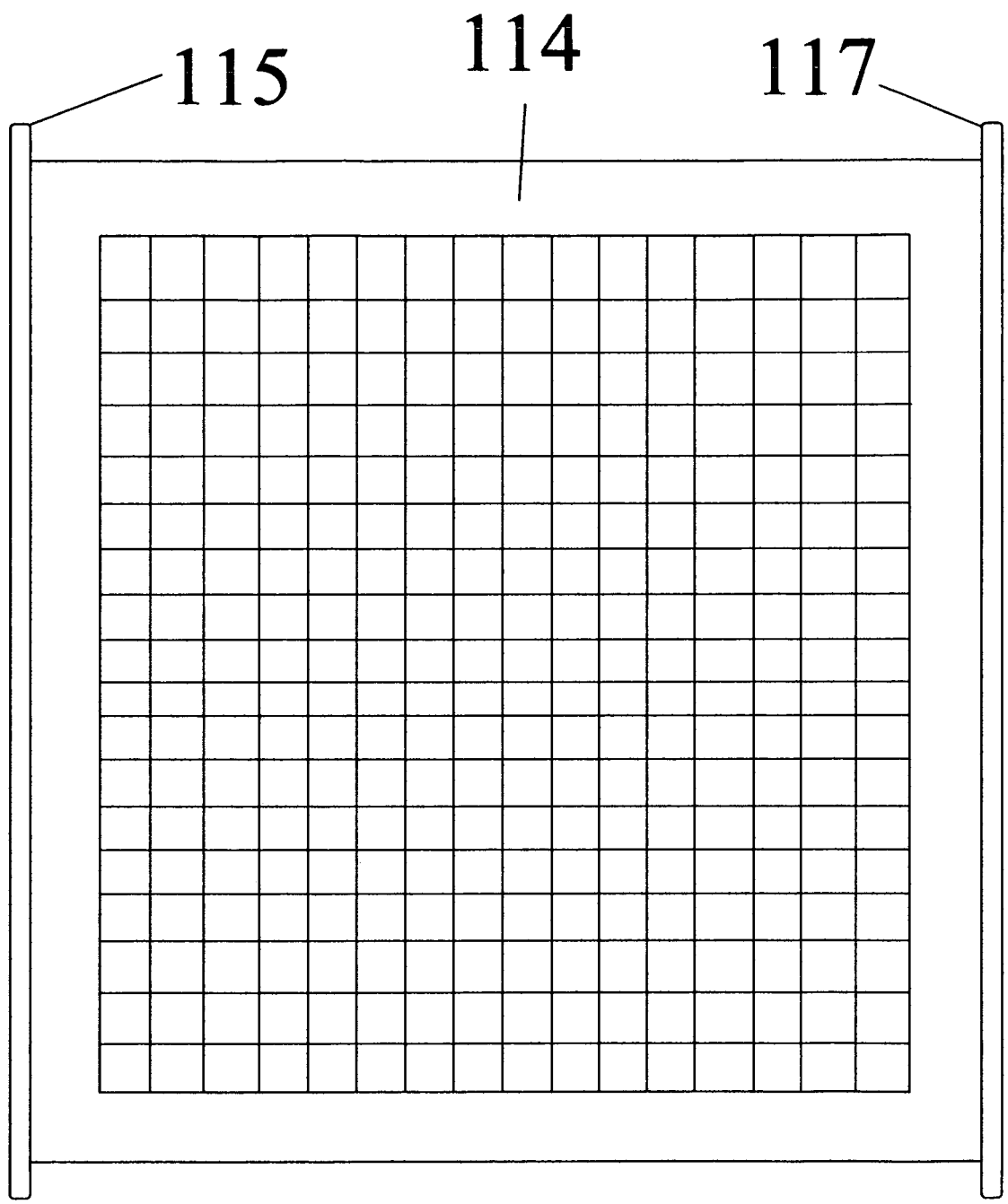
FIG. 9 is a simplified diagram of one embodiment of an internal swinging wall for a carrier.

FIG. 9 shows details of one embodiment of an internal swinging wall 114 from a horizontal perspective. The swinging wall may have ventilators (not necessarily the type, number, and location shown) or be solid.

In a collapsed configuration, the swinging wall 114 is aligned along the inner surface of the side of inner shell 103 (e.g., as shown in FIG. 7A). That is, from the top view perspective of FIG. 7A, the wall 114 is shown as being substantially vertical and adjacent the right hand side of the inner shell 103. With regard to the slots shown in FIG. 8, the axis 117 would be positioned near or at the top of the slots 118 and the axis 115 positioned near or at the right end of the slots 116.

As the carrier is expanded (e.g., as shown in FIGS. 7B and 8), the swinging end (e.g., with the axis 117) of wall 114 simultaneously slides forward. Here, the interaction of sliding axis 117 and slots 118 causes the forward movement of the swing end of the wall. Moreover, even though a portion of the opening 106 is now exposed, the wall 114 effectively blocks the opening 106.

The wall 114 ultimately rests along the inside of the front surface of inner shell 103 when the carrier is in an expanded configuration (e.g., as shown in FIG. 7C). That is, from the top view perspective of FIG. 7C, the wall 114 is shown as being substantially horizontal and adjacent the front side (at the bottom side of FIG. 7C) of the inner shell 103. With regard to the slots shown in FIG. 8, the axis 117 would be positioned in the short dimension of the L-shaped slots 118 and the axis 115 positioned near or at the left end of the slots 116.

As the carrier is collapsed, the swinging end of swinging wall 114 simultaneously slides backward to ultimately rest along the inside of the side surface of the inner shell 103 when the carrier is in a collapsed configuration. In some embodiments, the elbow of each L-shaped slot 118 may have a curved profile (instead of the substantially right angled profile depicted in FIG. 8) to facilitate passage of the axis 117 between the shorter and longer dimensions of the slots 118.

When the carrier is in an expanded configuration, swinging wall 114 may be prevented from accidental inward pivoting due to the position of the sliding axis 117 within the shorter dimension of slots 118. As discussed above, stops 111 and 112 located in the rear structural shoulders 104 of both shells 102 and 103, respectively, may prevent the rear portion of the inner shell 103 from exiting the rear portion of the outer shell 102 when the carrier is fully expanded. Likewise, the interlocking action of pivoting axis 115 and sliding axis 117 with slots 116 and 118, respectively, may prevent the front portion of the inner shell 103 from exiting the front portion of the outer shell 102 when the carrier is in an expanded configuration.

Figure 10:
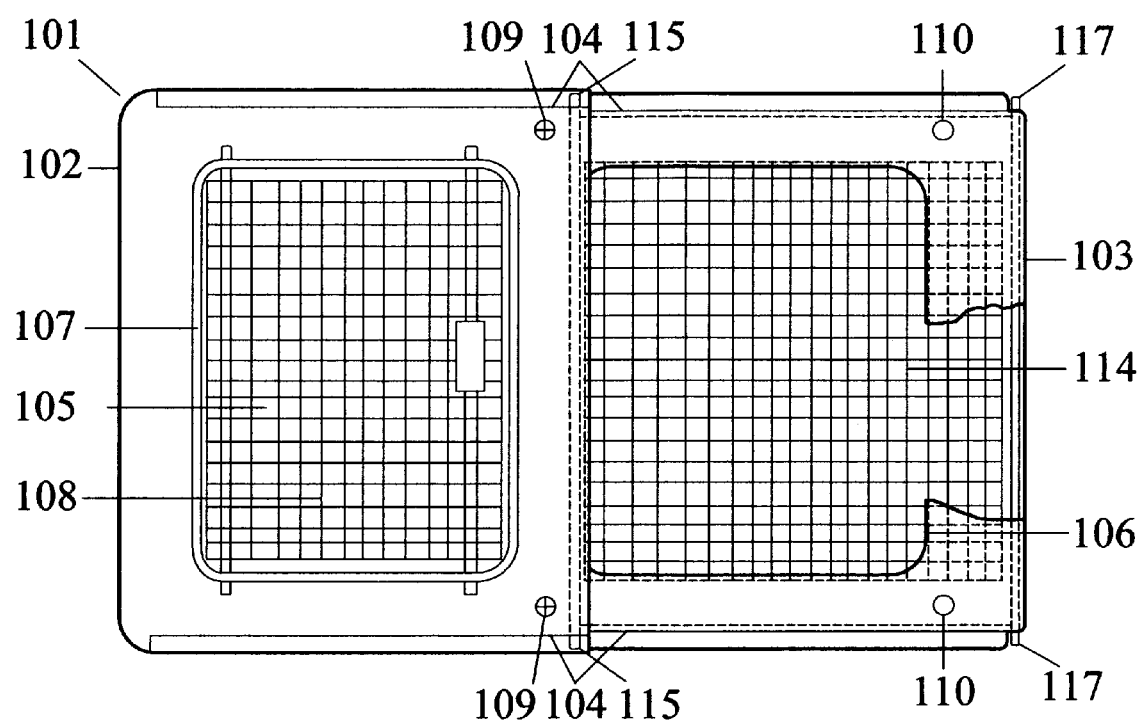
FIG. 10 is a simplified diagram of a front view of one embodiment of a carrier in an expanded configuration, with a cut-out section along the right hand side of graphic.

FIG. 10 depicts a cut-away view of the swinging internal wall 114 within the carrier 101 in a front-view expanded configuration, for added clarity. Here, it may be seen that the wall 114 effectively covers the opening 106.

Figure 11:
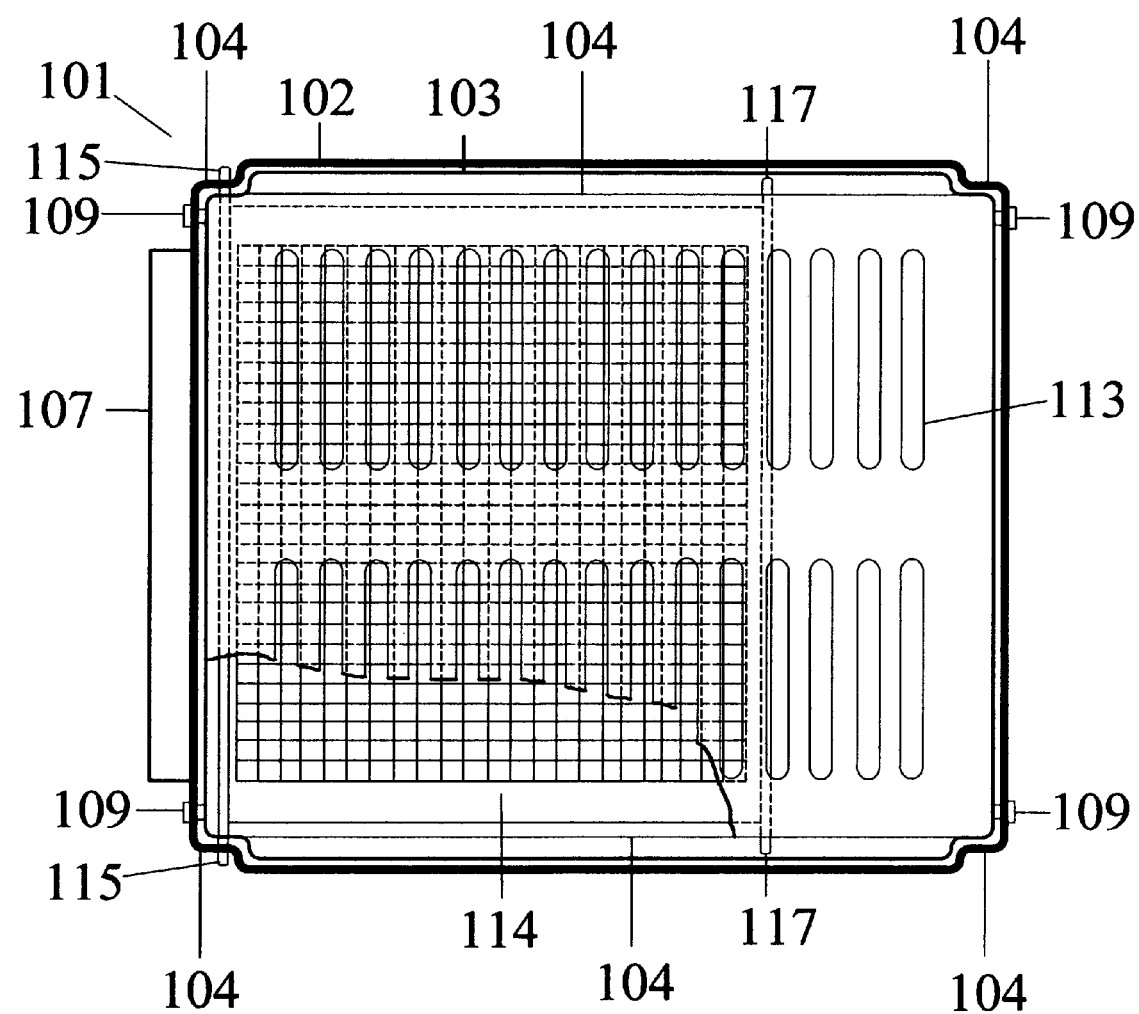
FIG. 11 is a simplified diagram of side view of one embodiment of a carrier from the perspective of an expanding side (e.g., an inner shell), with a cut-out section along the bottom of the graphic.

FIG. 11 depicts a cut-away view of the swinging internal wall 114 within the carrier 101 in a collapsed configuration from the perspective of the expanding direction (inner shell 103), for added clarity. Here, it may be seen that the wall 114 has moved to the side of the carrier 101 and, therefore, does not block the co-positioned openings 105 and 106 (not shown in this figure).

Embodiment 2

Figure 12A:
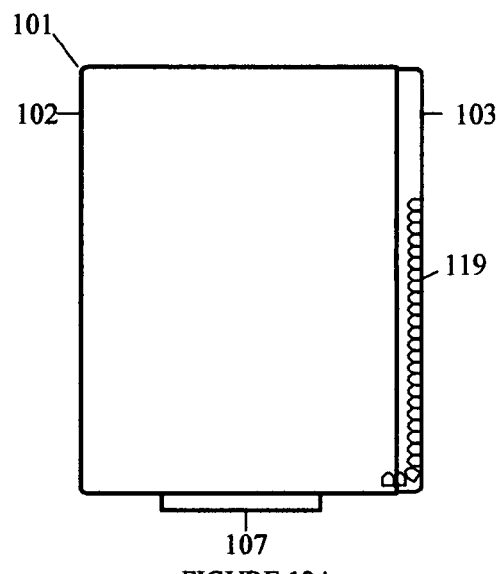
FIGS. 12A, 12B and 12C, is a simplified diagram showing a top view of one embodiment of a carrier in a collapsed configuration (FIG. 12A), an intermediary configuration (FIG. 12B), and an expanded configuration (FIG. 12C)
Figure 12B:
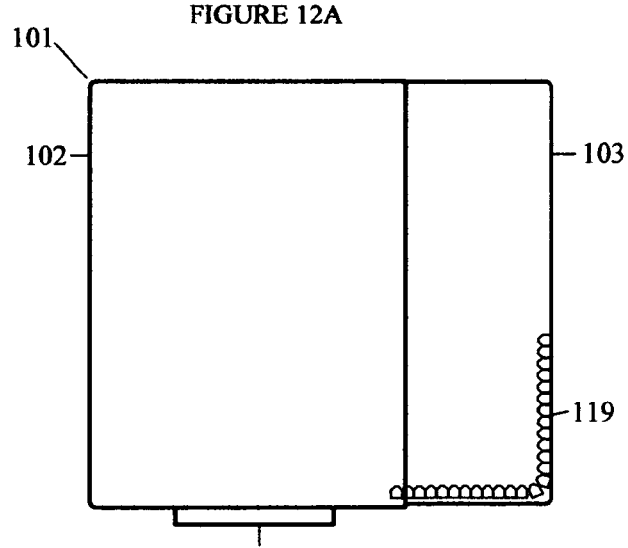
Figure 12C:
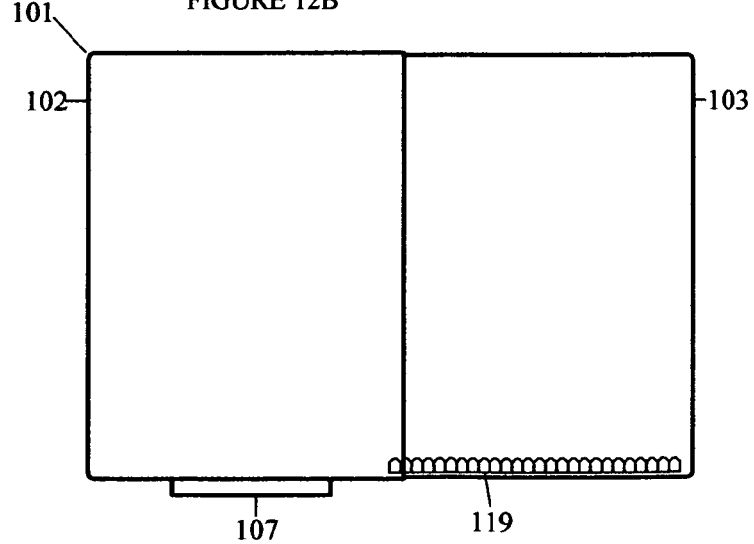

With reference now to FIGS. 12 through 18, an embodiment will be described wherein an internal sliding wall is used to prevent escape of an animal through the opening 106 in the front surface of the inner shell 103. FIG. 12 conceptually depicts the action of the sliding wall 119 from a vertical perspective when the carrier 101 is in a collapsed configuration (FIG. 12A), an intermediary configuration (FIG. 12B), and an expanded configuration (FIG. 12C). The sliding wall may take a variety of forms. For example, the sliding wall may be a unitary flexible wall, an articulated wall or take some other form.

Figure 13:
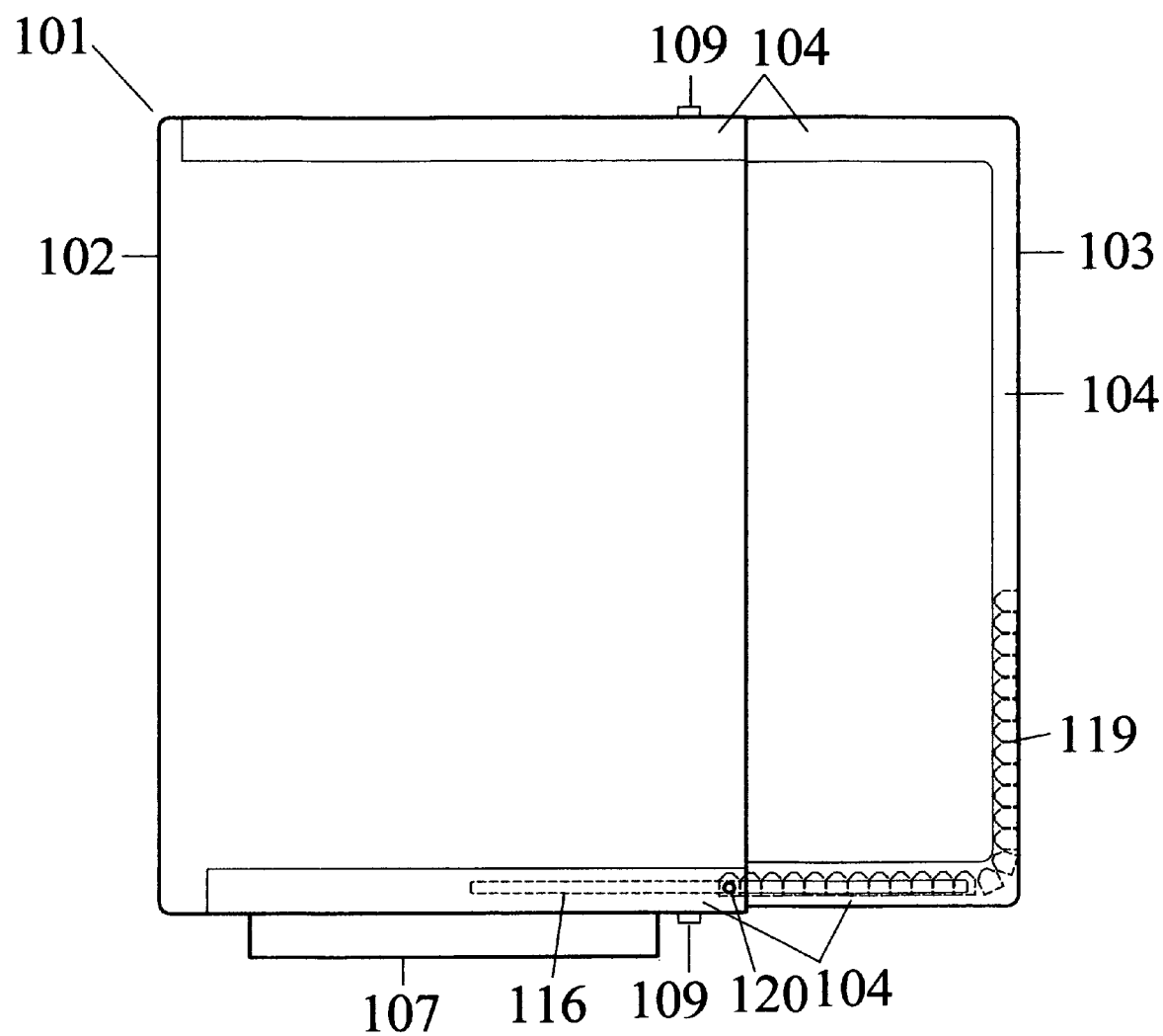
FIG. 13 is a simplified diagram showing a top view of one embodiment of a carrier in an intermediary configuration.

FIG. 13 illustrates one embodiment of a sliding articulated wall 119 in relation to the carrier 101 from a vertical perspective. In the illustrated embodiment the sliding articulated wall 119 is anchored to the outer shell 102 by a stationary axis 120. Thus, a member of the wall (e.g., the axis 120) may be rotatably coupled to a stationary member of the outer shell 102. Axis 120 may, for example, protrude through slots 116 formed on or within the front shoulders 104 of inner shell 103 to allow the shell 103 to slide past this axis in a substantially unobstructed manner. The other end of the sliding articulated wall 119 is unattached and allowed to slide in a relatively free manner along the inner surface of the side and front of inner shell 103, as described below.

Figure 14:
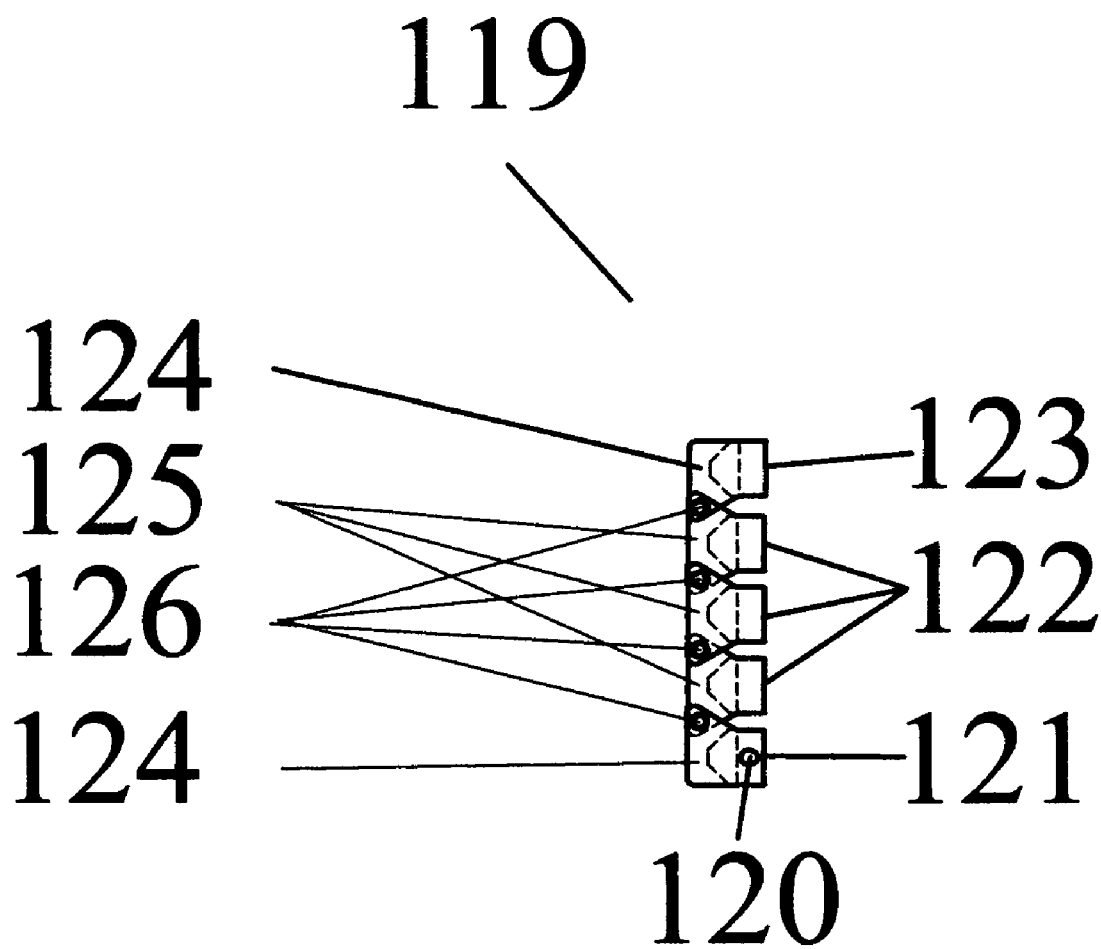
FIG. 14 is a simplified diagram showing top view showing details of one embodiment of an articulated wall for a carrier.

FIG. 14 illustrates one embodiment of a sliding articulated wall 119 in a vertical perspective. The sliding articulated wall 119 includes several members: a stationary (e.g., anchored) end section 121, sliding articulated middle sections 122, and a sliding end section 123. To reduce the complexity of FIG. 14, only three middle sections 122 are shown. In practice, however, many more middle sections 122 may be used to form the wall 119. The stationary end section 121 is anchored to the outer shell 102 by the stationary (e.g., anchored) axis 120. Thus, a member of the wall (e.g., the axis 120) may be rotatably coupled to a stationary member (e.g., a hole or other member) of the outer shell 102. The stationary end section 121, the middle sections 122, and the sliding end section 123 articulate with each other, for example, via overlapping horizontal integral mono-lobate tabs 124 (end sections 121 and 123) or bi-lobate tabs 125 (middle sections 122) that are connected by dowels 126 that extend vertically through holes within the lobes of tabs 124 and 125. Alternatively, such interconnected lobed members (e.g., tabs 124 and 125) may be connected to each other via rivets, snaps or some other mechanism.

Figure 15:
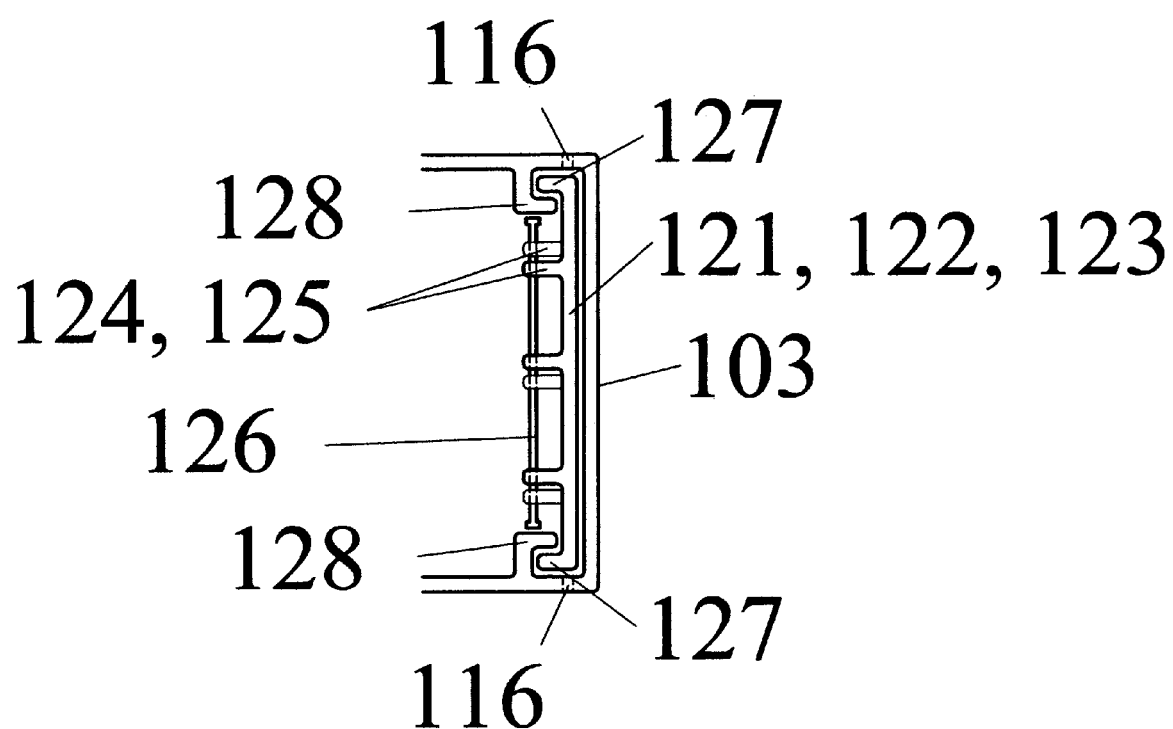
FIG. 15 is a simplified diagram of a side view showing details of one embodiment of an articulated wall for a carrier.

FIG. 15 illustrates one embodiment of a sliding articulated wall 119 in a horizontal perspective. In some embodiments each articulated wall section (121, 122, 123) is equipped at the top and bottom ends with integral horizontal feet 127 that extend inward and beneath horizontal wall guides 128 that are provided on or incorporated into the inner surface of the front and side shoulders 104 of inner shell 103. Alternatively, in some embodiments the stationary end section 121 may not incorporate the feet 127.

Figure 16:
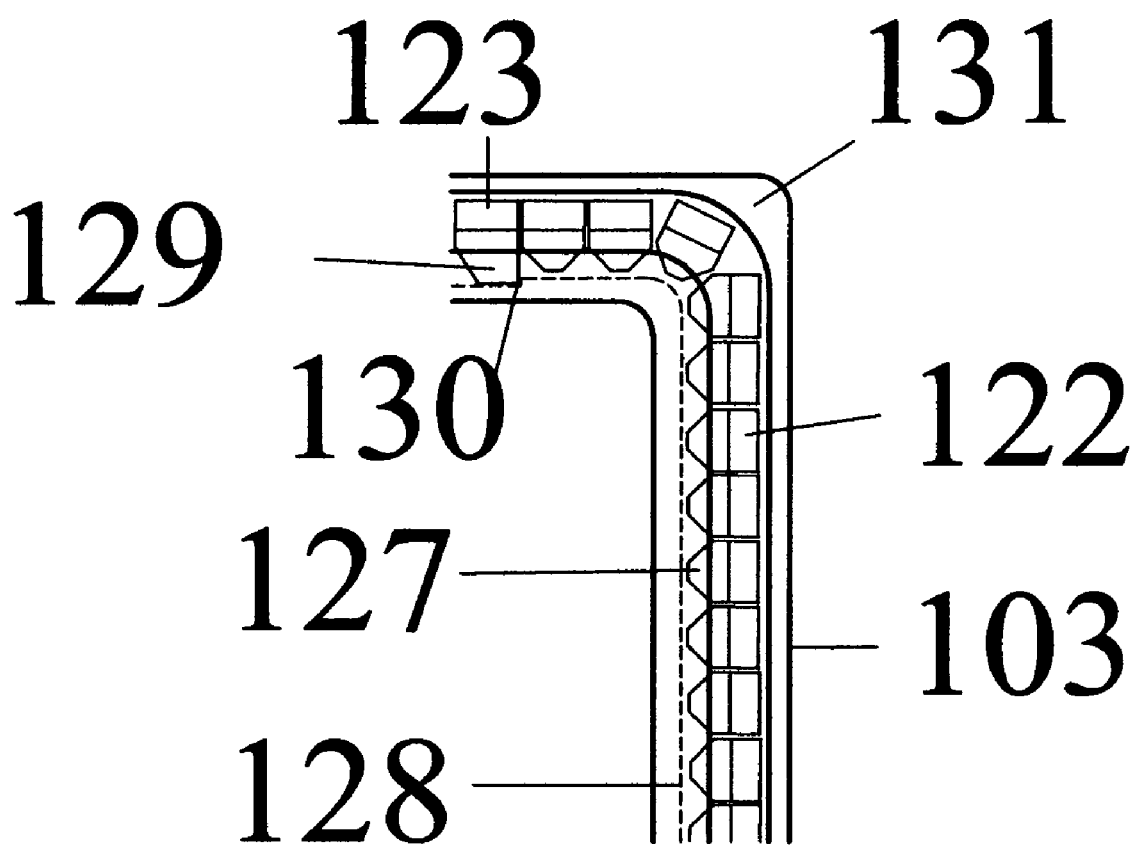
FIG. 16 is a simplified diagram of a top view showing details of one embodiment of a sliding free end of a sliding articulated wall for a carrier.

FIG. 16 depicts the sliding articulated wall 119 in a vertical perspective at sliding end section 123, near the junction of the side/front walls of inner shell 103. In FIG. 16, the side of the shell 103 is shown at the top of the figure while the front of the shell 103 is shown on the right hand side of the figure. In some embodiments sliding end section 123 may include oversized feet 129 such that they are prevented from sliding past constrictions 130 in guides 128 when the carrier is in an expanded configuration. In addition, vertical corner 131 formed between the front and side surfaces of the inner shell 103 may be thickened and curved such that it directs the sliding articulated wall around the corner within the guides 128 without binding when the carrier is being expanded or contracted.

As the carrier 101 is expanded and collapsed, the movement of the shells 102, 103 causes a portion of the sliding articulated wall 119 to be simultaneously drawn across and retracted from the opening 106, respectively. In particular, the movement of the end section 121 of the sliding articulated wall 119 (anchored to the outer shell 102) relative to the inner shell 103 and the interaction of the feet 127 and guides 128 causes the sliding articulated wall 119 to move to the desired positions. In a collapsed configuration, the sliding articulated wall 119 is extended along the inner surface of portions of the front and side surface of the inner shell 103. Here, the majority of the wall 119 is extended along the side surface of the inner shell 103. Conversely, in an expanded configuration, the majority of the wall 119 is extended along the front surface of the inner shell 103.

When the carrier 101 is in an expanded configuration, the interaction of feet 127 and corresponding guides 128 prevent sliding articulated wall 119 from being pushed inward or outward through opening 106. It should be appreciated, however, that in some embodiments one or more of the wall sections 121, 122, 123 may not incorporate the feet 127 and that the wall guides 128 may take a different form.

The finite length of sliding articulated wall 119 may prevent the front portion of the inner shell 103 from swinging out of the front portion of the outer shell 102 when the carrier 101 is in an expanded configuration. Accordingly, in combination with the stops discussed in conjunction with FIG. 6, the inner shell 103 may be prevented from exiting the outer shell 102 when the carrier 101 is fully expanded.

Figure 17:
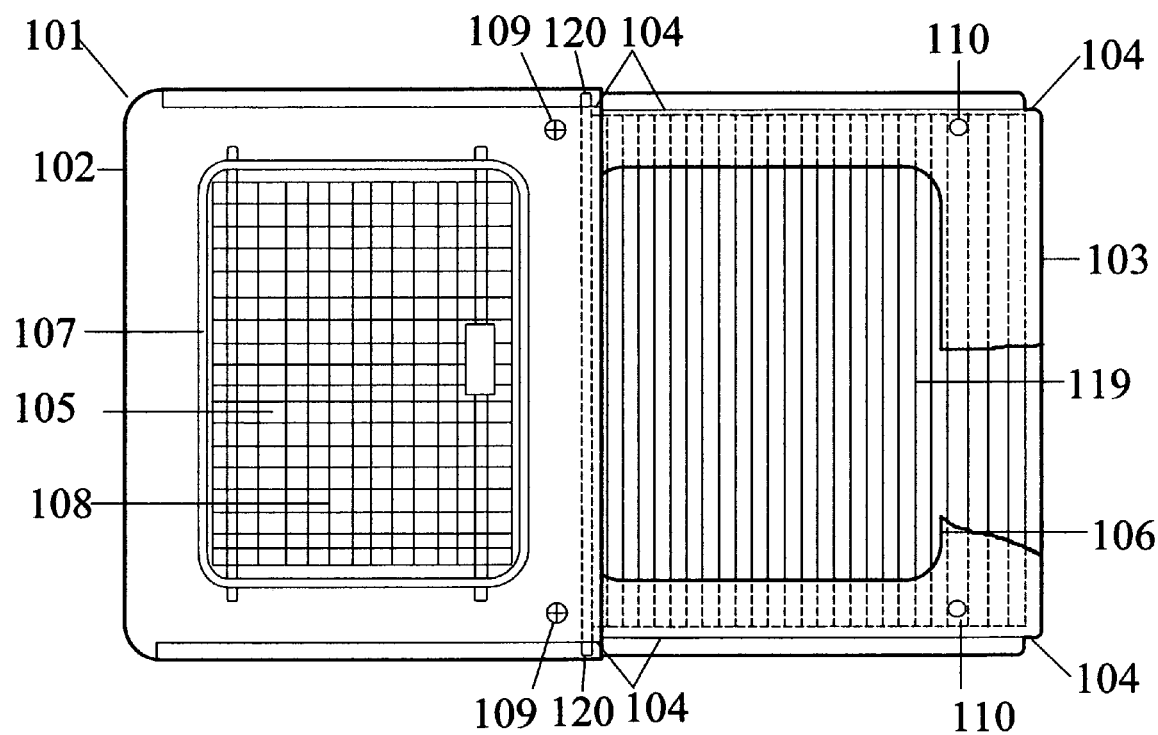
FIG. 17 is a simplified diagram of a front view of one embodiment of a carrier in an expanded configuration, with a cut-out section along the right hand side of graphic.

FIG. 17 depicts a cut-away view of the sliding articulated wall 119 within carrier 101 in a front-view expanded configuration, for added clarity. Here, it may be seen that the wall 119 effectively covers the opening 106.

Figure 18:
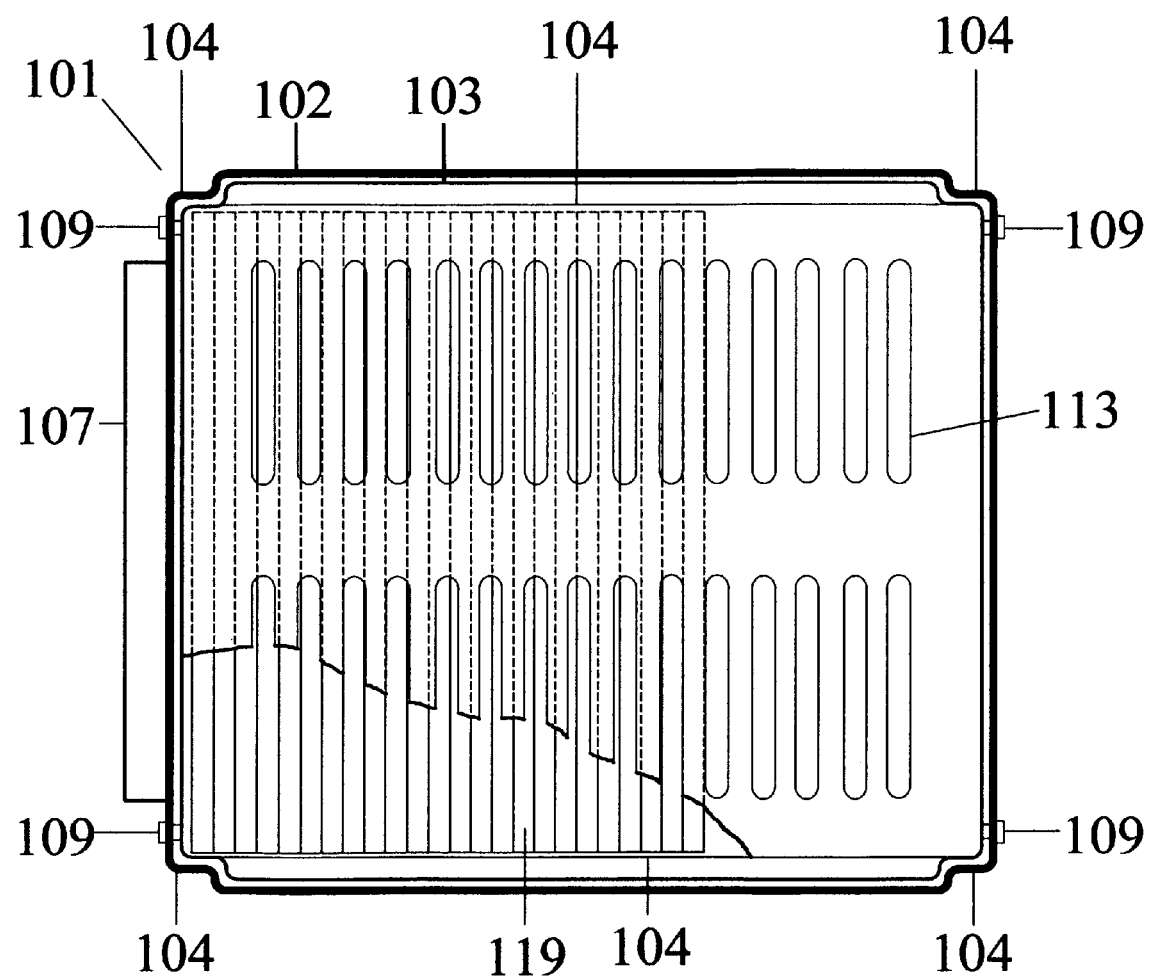
FIG. 18 is a simplified diagram of a side view of one embodiment of a carrier from a perspective of an expanding side (e.g., an inner shell), with a cut-out section along the bottom of the graphic.

FIG. 18 depicts a cut-away view of the sliding articulated wall 119 within carrier 101 in a collapsed configuration from the perspective of the expanding direction (inner shell 103), for added clarity. Here, it may be seen that the wall 119 has moved to the side of the carrier 101 and, therefore, does not block the co-positioned openings 105 and 106 (not shown in this figure).

Embodiment 3

Figure 19A:
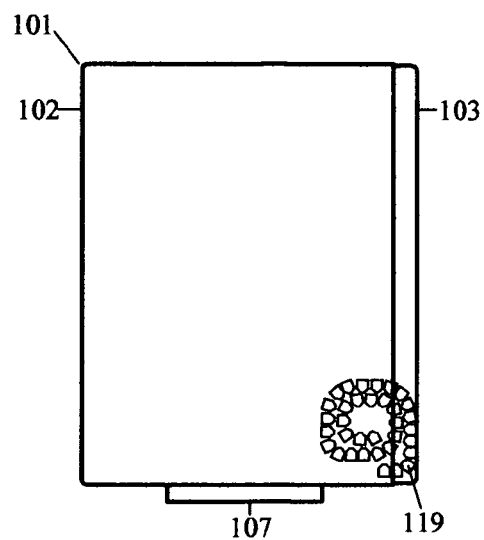
FIGS. 19A, 19B and 19C, is a simplified diagram showing a top view of one embodiment of a carrier in a collapsed configuration (FIG. 19A), an intermediary configuration (FIG. 7B), and an expanded configuration (FIG. 19C)
Figure 19B:
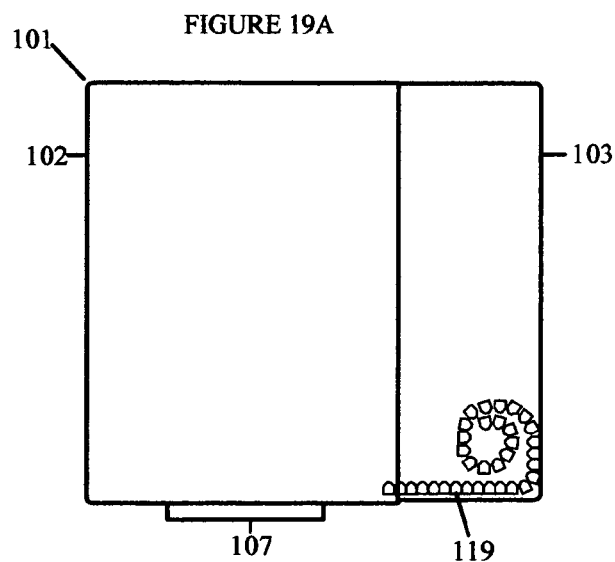
Figure 19C:
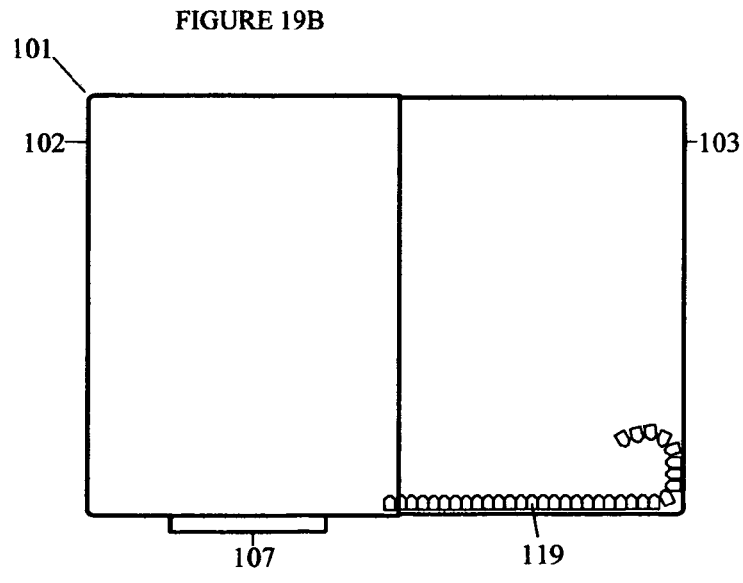

With reference now to FIGS. 19 through 23, one embodiment of a carrier 101 will be described in which an internal side-mounted roll-up wall is used to prevent escape of an animal through the opening 106 within the front surface of the inner shell 103. FIG. 19 conceptually depicts the action of the side-mounted roll-up wall 119 from a vertical perspective when the carrier 101 is in a collapsed configuration (FIG. 19A), an intermediary configuration (FIG. 19B), and an expanded configuration (FIG. 19C). The roll-up wall 119 may take a variety of forms. For example, the roll-up wall 119 may be a unitary flexible wall, an articulated wall or take some other form.

Figure 20:
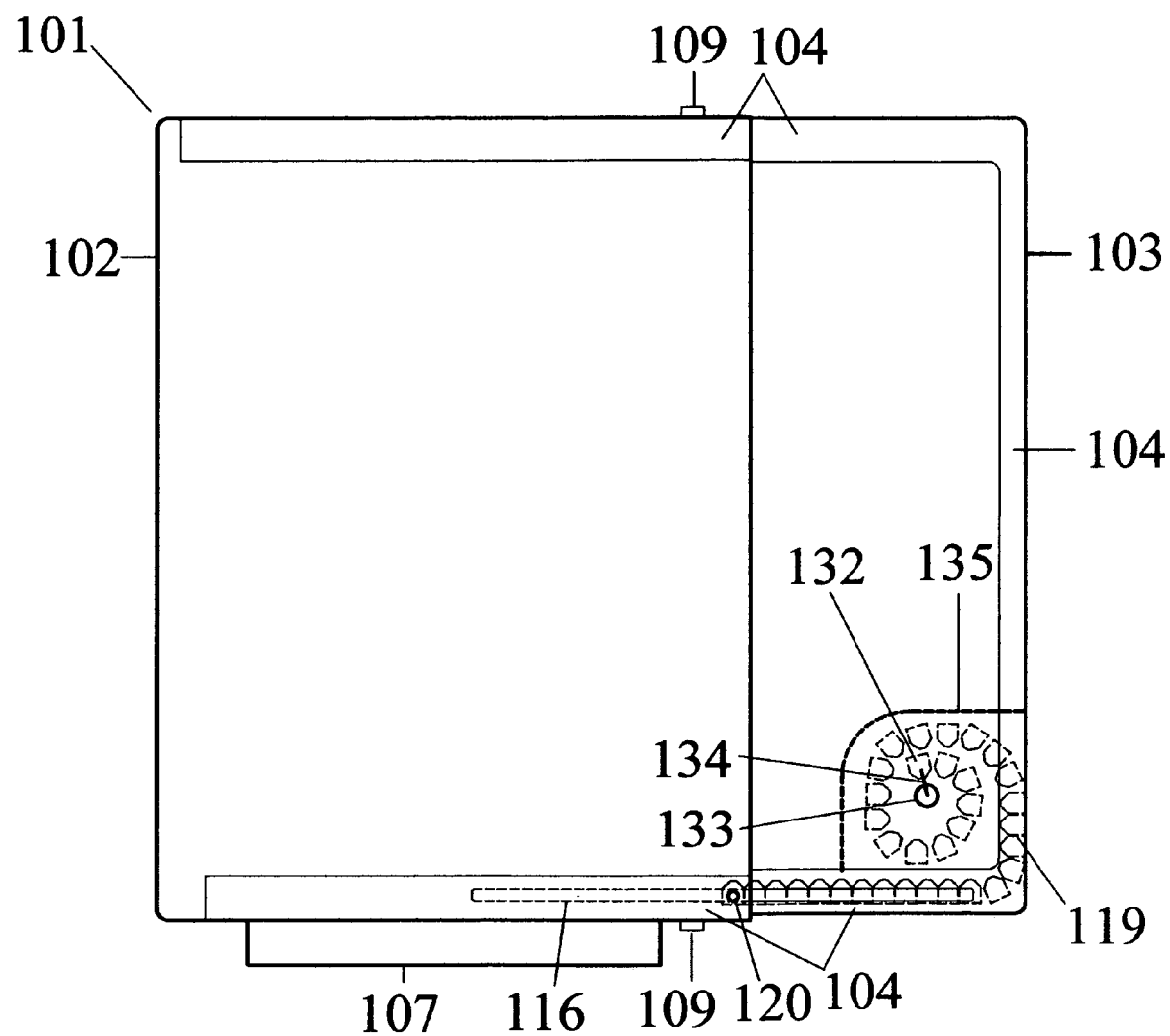
FIG. 20 is a simplified diagram showing a top view of one embodiment of a carrier in an intermediary configuration.

FIG. 20 illustrates one embodiment of a side-mounted roll-up articulated wall 119 in relation to the carrier 101 from a vertical perspective. In some embodiments the side-mounted roll-up articulated wall 119 includes similar components (e.g., as described in conjunction with FIG. 14), slides within similar integral guides (e.g., as described in conjunction with FIGS. 15 and 16), and is anchored to the outer shell 102 by a stationary axis 120, as previously described in embodiment 2. Other mechanisms may be employed, however, to facilitate rolling up the wall. For example, rather than using a sliding end section 123 for the side-mounted roll-up articulated wall 119 as described in embodiment 2, an internal side-mounted roll-up wall may incorporate a terminal end section 132. In some embodiments the terminal end section 132 may be equipped with mono-lobate tabs 124 that are connected to the bi-lobate tabs 125 of an adjacent middle section (e.g., a section 122 discussed above). In some embodiments the terminal end section 132 may not incorporate feet as described above. The terminal end section 132 may be attached to a vertically-oriented roll-up axis 133 via horizontal attachment arms 134. Thus, the axis 133 may be effectively rotatably coupled to the inner shell 103. The roll-up mechanism may be isolated by a vertical enclosure 135 extending, for example, between the inner top and bottom surfaces of the inner shell 103. The enclosure 135 may have a shape (e.g. boxed, curved) to sufficiently protect the roll-up wall 119 while taking up minimal space.

Figure 21:
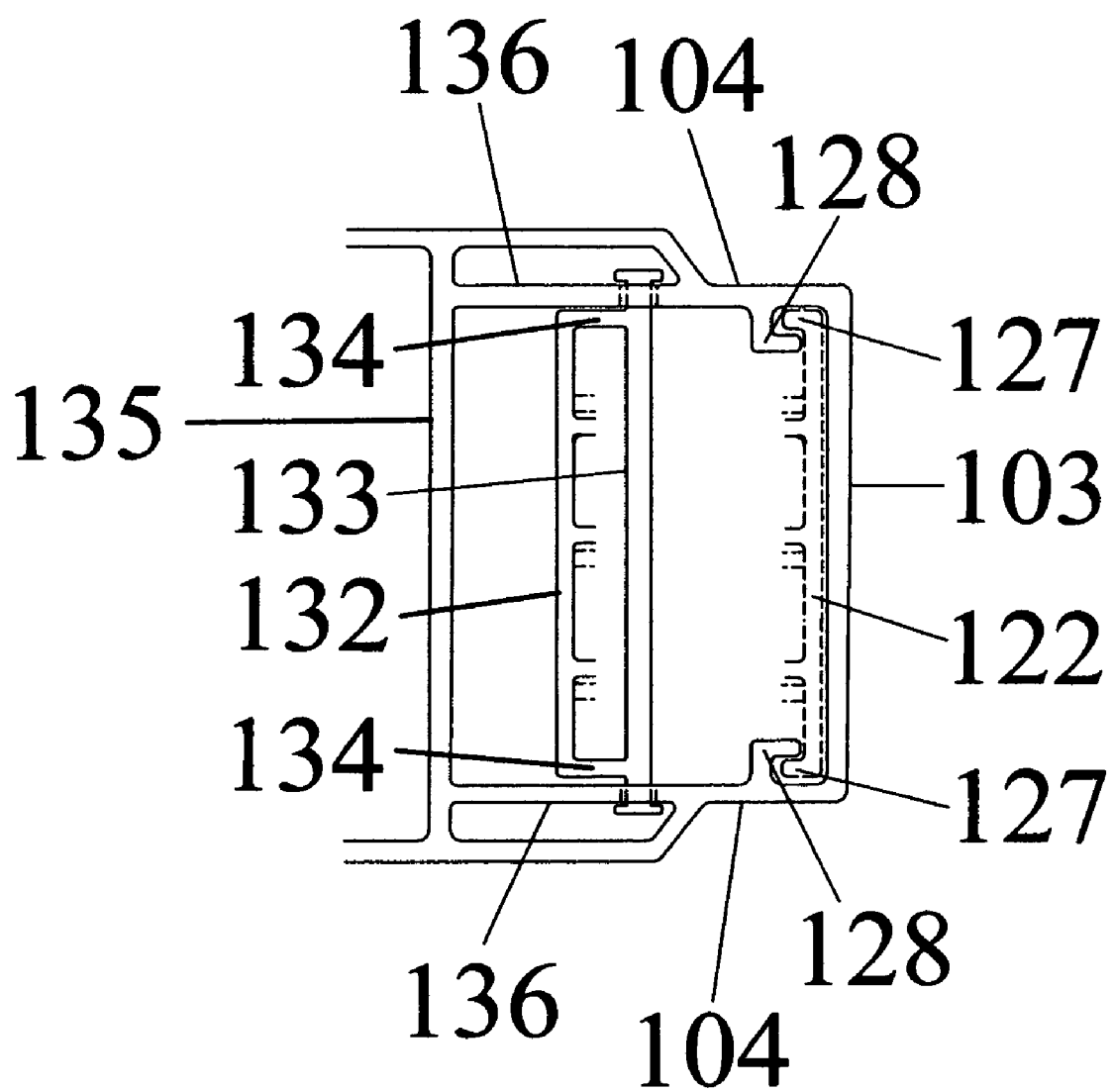
FIG. 21 is a simplified diagram of a side view showing details of one embodiment of a roll-up mechanism for a carrier.

FIG. 21 illustrates in a simplified, partial view one embodiment of a side-mounted roll-up mechanism from a horizontal perspective. This roll-up mechanism may include, for example, horizontal platforms 136 to guide the side-mounted roll-up articulated wall 119 as it is wound up onto the roll-up axis 133. In some embodiments, the roll-up mechanism may incorporate other mechanisms (e.g., tension devices such as springs, not shown in FIG. 21) to facilitate the movement (e.g., rolling up) of the wall 119.

In a collapsed configuration, the side-mounted roll-up articulated wall 119 is extended along the inner surface of a portion of the front surface of inner shell 103 and is wound up on roll-up axis 133 (e.g., as illustrated in FIG. 19A). As the carrier is expanded (e.g., as illustrated in FIGS. 19B and 19C), the end of the side-mounted roll-up articulated wall 119 that is anchored via stationary axis 120, allows the remainder of the side-mounted roll-up articulated wall 119 to be simultaneously drawn across opening 106 while it unwinds from roll-up axis 133. Conversely as the carrier is collapsed, stationary axis 120 allows the remainder of side-mounted roll-up articulated wall 119 to be simultaneously pushed across opening 106 while it is wound up onto roll-up axis 133.

When the carrier 101 is in an expanded configuration, the interaction of the side-mounted roll-up articulated wall 119, the middle section feet 127 and the guides 128 may prevent the side-mounted roll-up articulated wall 119 from being pushed inward or outward through the opening 106.

The finite length of the side-mounted roll-up articulated wall 119 also may prevent the front portion of the inner shell 103 from swinging out of the front portion of the outer shell 102 when the carrier 101 is in an expanded configuration. Accordingly, in combination with the stops discussed in conjunction with FIG. 6, the inner shell 103 may be prevented from exiting the outer shell 102 when the carrier is fully expanded.

Figure 22:
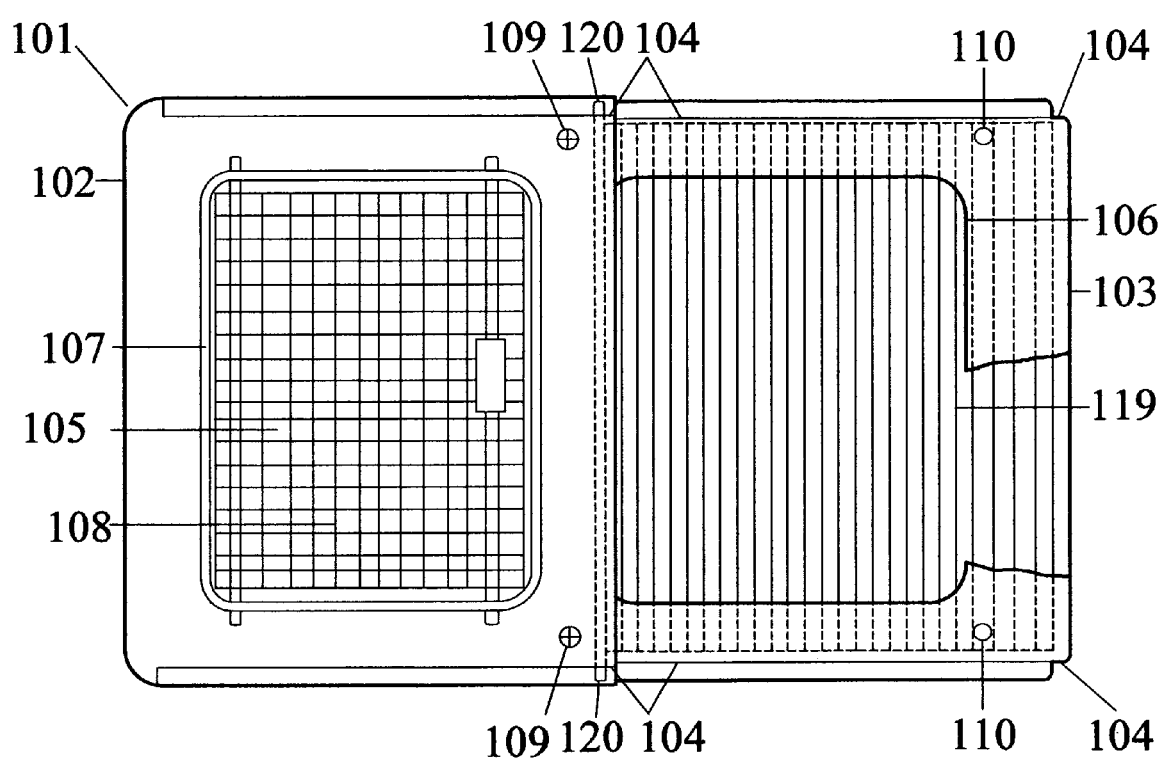
FIG. 22 is a simplified diagram of a front view of one embodiment of a carrier in an expanded configuration, with a cut-out section along the right hand side of the graphic.

FIG. 22 depicts a cut-away view of the side-mounted roll-up articulated wall 119 within the carrier 101 in a front-view expanded configuration, for added clarity. Here, it may be seen that the wall 119 effectively covers the opening 106.

Figure 23:
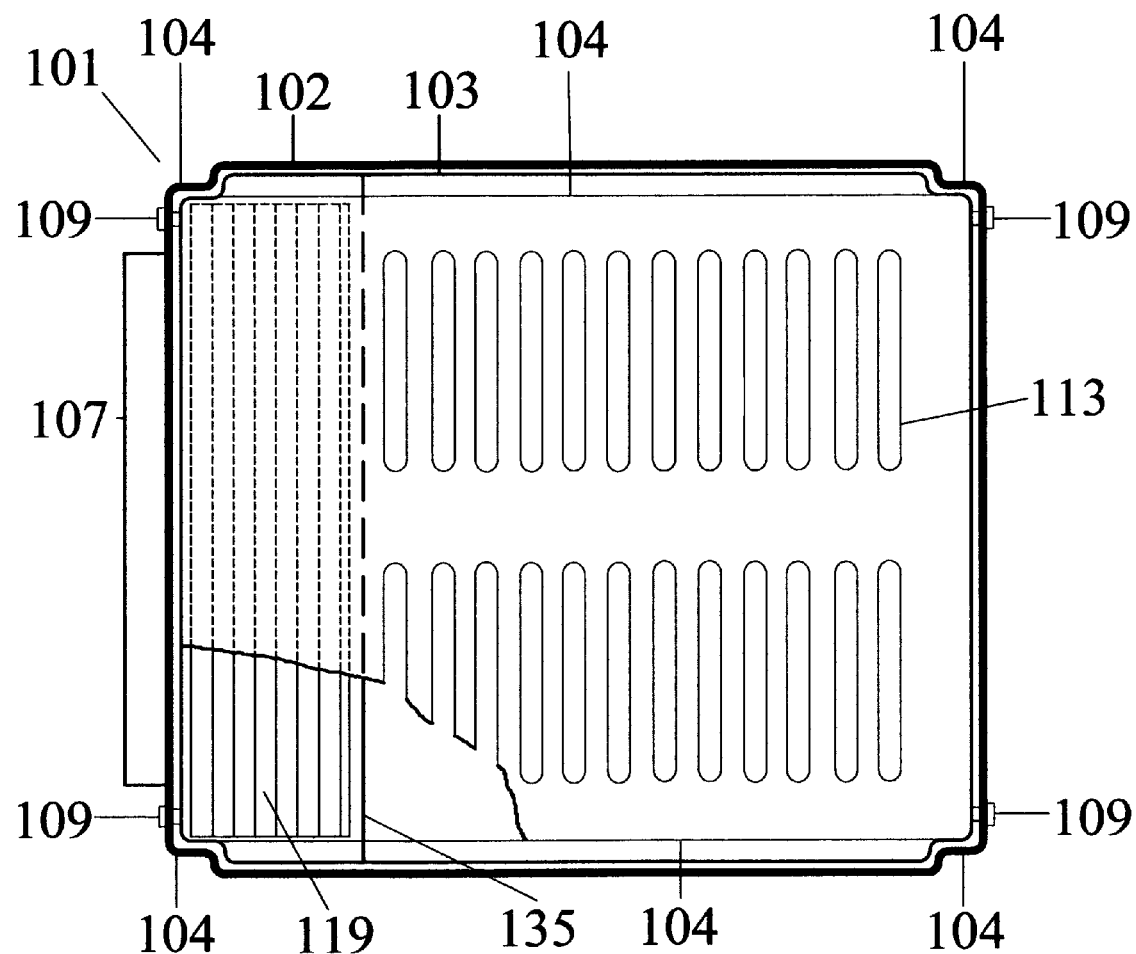
FIG. 23 is a simplified diagram of a side view of one embodiment of a carrier from a perspective of an expanding side (e.g., an inner shell), with a cut-out section along the bottom of the graphic.

FIG. 23 depicts a cut-away view of the side-mounted roll-up articulated wall 119 within the carrier 101 in a collapsed configuration from the perspective of the expanding direction (inner shell 103), for added clarity. Here, the wall 119 has been rolled-up within the enclosure 135 and, therefore, does not block the co-positioned openings 105 and 106 (not shown in this figure).

Embodiment 4

Figure 24A:
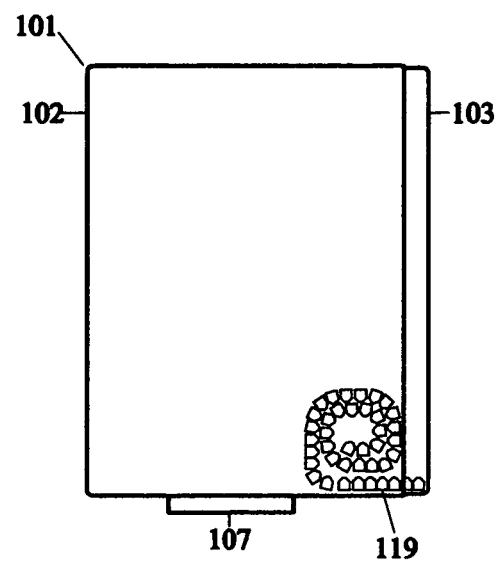
FIGS. 24A, 24B and 24C, is a simplified diagram showing a top view of one embodiment of a carrier in a collapsed configuration (FIG. 24A), an intermediary configuration (FIG. 24B), and an expanded configuration (FIG. 24C)
Figure 24B:
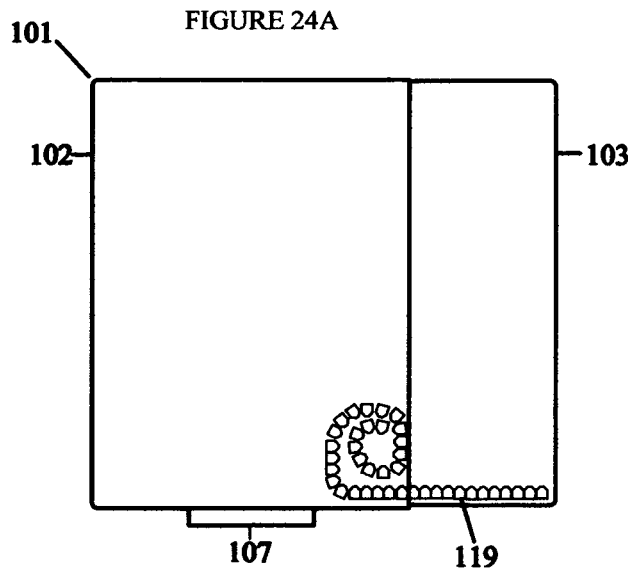
Figure 24C:
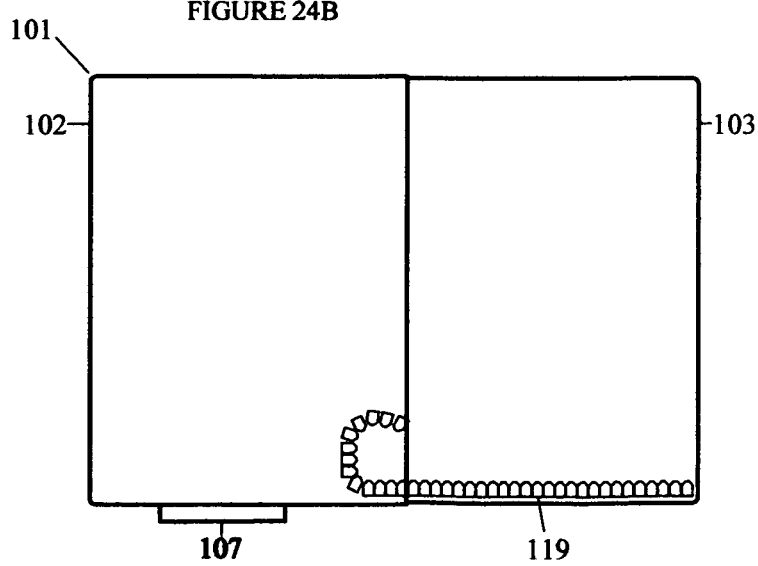

With reference now to FIGS. 24 through 27, one embodiment of a carrier 101 will be described in which an internal center-mounted roll-up articulated wall is used to prevent escape of an animal through the opening 106 within the front surface of the inner shell 103. FIG. 24 conceptually depicts the action of the center-mounted roll-up articulated wall 119 from a vertical perspective when the carrier 101 is in a collapsed configuration (FIG. 24A), an intermediary configuration (FIG. 24B), and an expanded configuration (FIG. 24C).

Figure 25:
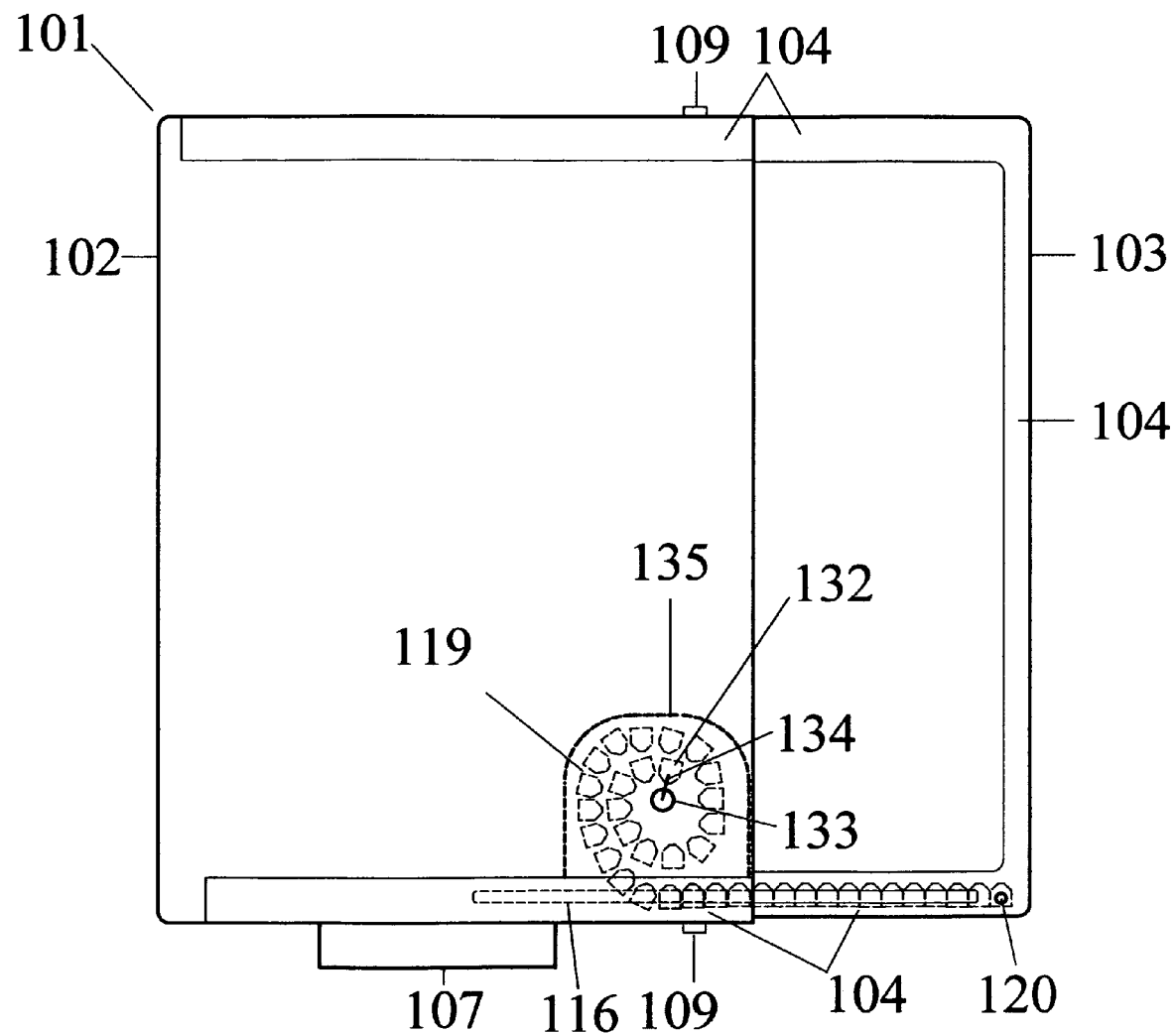
FIG. 25 is a simplified diagram showing a top view of one embodiment of a carrier in an intermediary configuration.

FIG. 25 shows several details of the center-mounted roll-up articulated wall 119 in relation to the carrier 101 from a vertical perspective. In some embodiments the center-mounted roll-up articulated wall 119 may include similar components (e.g., from FIGS. 14 and 21) and slides within similar integral guides (e.g., from FIGS. 15 and 16), as previously described in embodiment 3. Other mechanisms may be employed, however, to support the center mounting of the wall 119. For example, the positions of the stationary axis 120 and the roll-up mechanism may be reversed and the center-mounted roll-up articulated wall 119 may be anchored to the inner shell 103 by a stationary axis 120. As in embodiment 3, the terminal end section 132 of the center-mounted roll-up articulated wall 119 may lack feet and may be equipped with mono-lobate tabs 124 that are connected to the bi-lobate tabs 125 of the adjacent middle section 122. The terminal end section 132 of the center-mounted roll-up articulated wall 119 may be attached to the vertically-oriented roll-up axis 133 via horizontal attachment arms 134. Thus, the axis 133 may be effectively rotatably coupled to the outer shell 102. The center-mounted roll-up mechanism may incorporate similar components as previously described for embodiment 3 and may be isolated by a vertical enclosure 135 that may, for example, extend between the inner top and bottom surfaces of the outer shell 102.

In a collapsed configuration, the center-mounted roll-up articulated wall 119 is extended along the inner surface of a portion of the front surface of the inner shell 103 and is wound up on the roll-up axis 133. As the carrier 101 is expanded, the end of the center-mounted roll-up articulated wall 119 that is anchored via the stationary axis 120 allows the center-mounted roll-up articulated wall 119 to be simultaneously drawn across the opening 106 while it unwinds from the roll-up axis 133. Conversely as the carrier 101 is collapsed, the end of the center-mounted roll-up articulated wall 119 that is anchored via the stationary axis 120 causes the remainder of the center-mounted articulated wall 119 to be simultaneously pushed so that it is wound up onto the roll-up axis 133.

When the carrier is in an expanded configuration, the interaction of the center-mounted roll-up articulated wall 119, the middle section feet 127 and the guides 128 may prevent the center-mounted roll-up articulated wall 119 from being pushed inward or outward through the opening 106.

The finite length of the center-mounted roll-up articulated wall 119 also may prevent the front portion of the inner shell 103 from swinging out of the front portion of the outer shell 102 when the carrier 101 is in an expanded configuration. Accordingly, in combination with the stops discussed in conjunction with FIG. 6, the inner shell 103 may be prevented from exiting the outer shell 102 when the carrier 101 is fully expanded.

Figure 26:
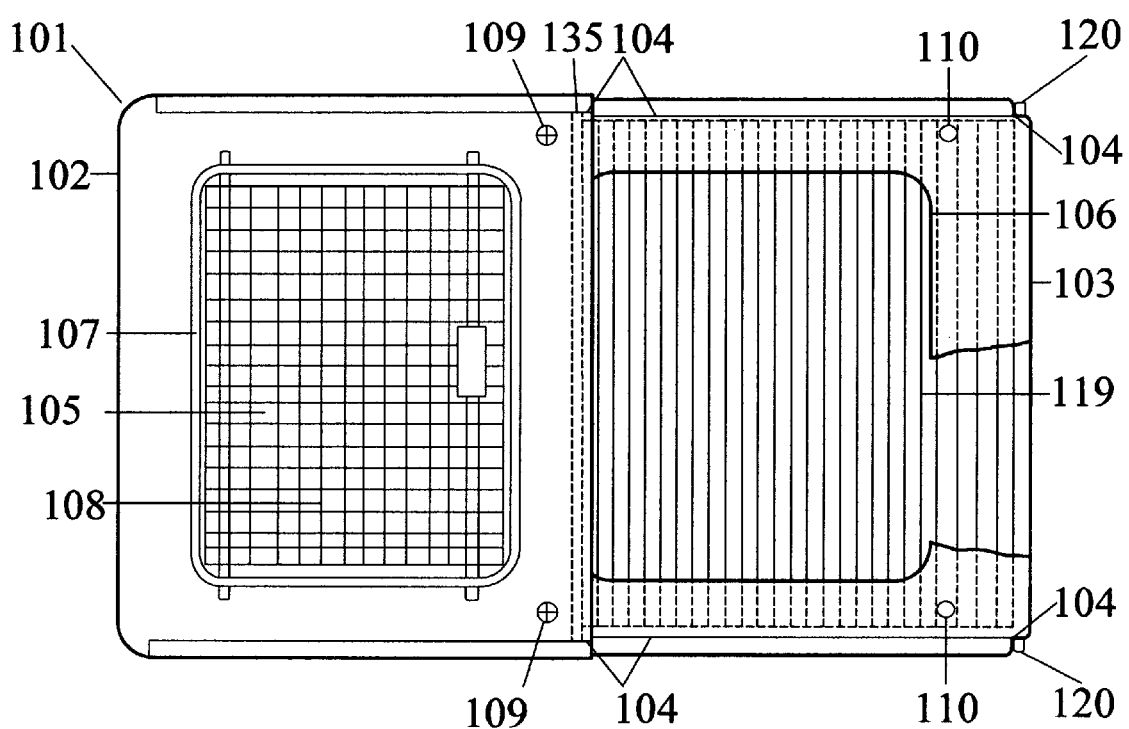
FIG. 26 is a simplified diagram of a front view of one embodiment of a carrier in an expanded configuration, with a cut-out section along the right hand side of the graphic.

FIG. 26 depicts a cut-away view of the center-mounted roll-up articulated wall 119 within the carrier 101 in a front-view expanded configuration, for added clarity. Here, it may be seen that the wall 119 effectively covers the opening 106.

Figure 27:
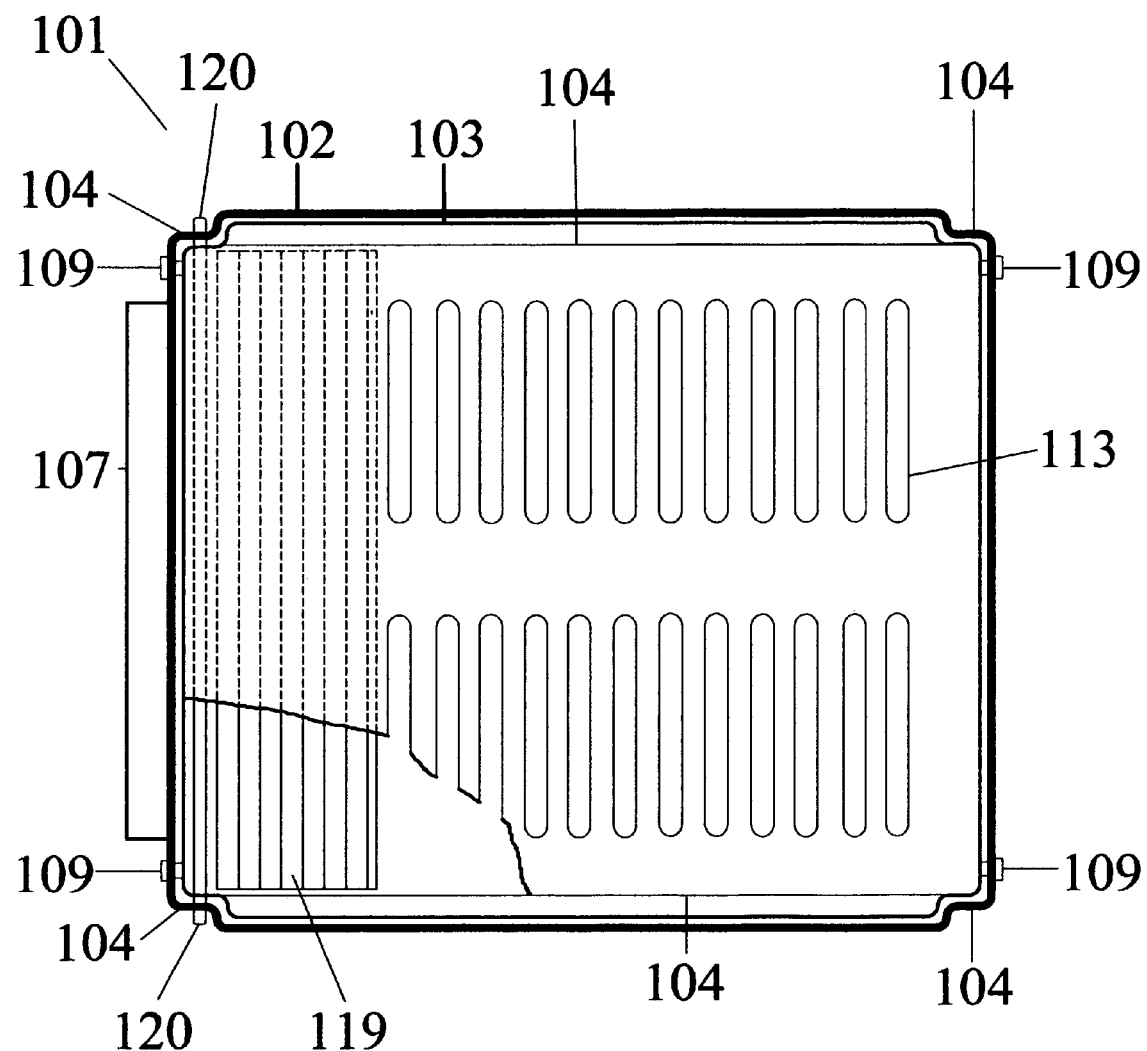
FIG. 27 is a simplified diagram of a side view of one embodiment of a carrier from a perspective of an expanding side (e.g., an inner shell), with a cut-out section along the bottom of the graphic.

FIG. 27 depicts a cut-away view of the center-mounted roll-up articulated wall 119 within the carrier 101 in a collapsed configuration from the perspective of the expanding direction (inner shell 103), for added clarity. Here, the wall 119 has been rolled-up within the enclosure 135 and, therefore, does not block the co-positioned openings 105 and 106 (not shown in this figure).

Embodiment 5

Figure 28A:
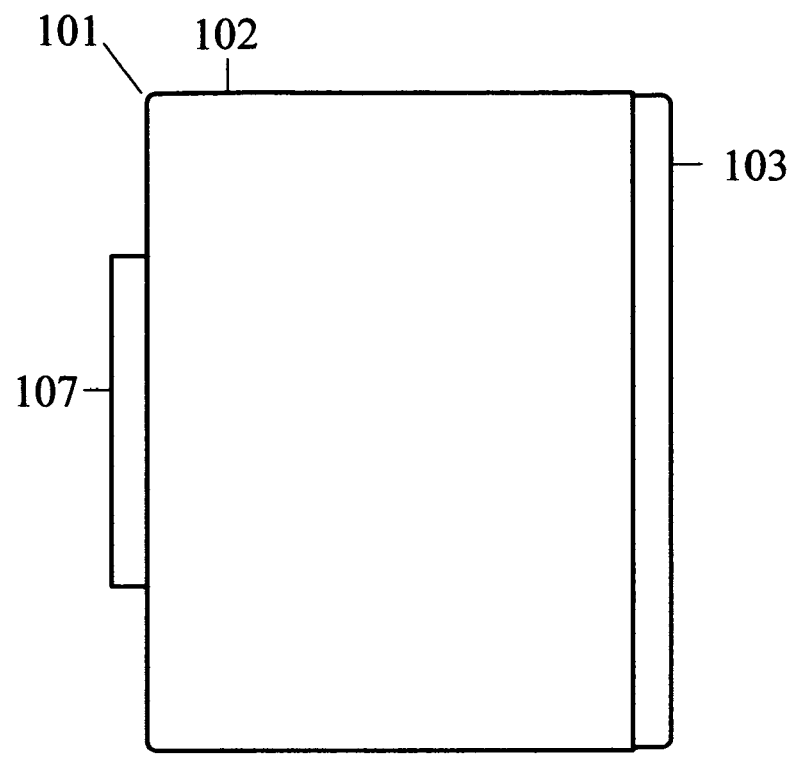
FIGS. 28A and 28B, is a simplified diagram of a top view of one embodiment of a carrier in a collapsed configuration (FIG. 28A) and an expanded configuration (FIG. 28B)
Figure 28B:
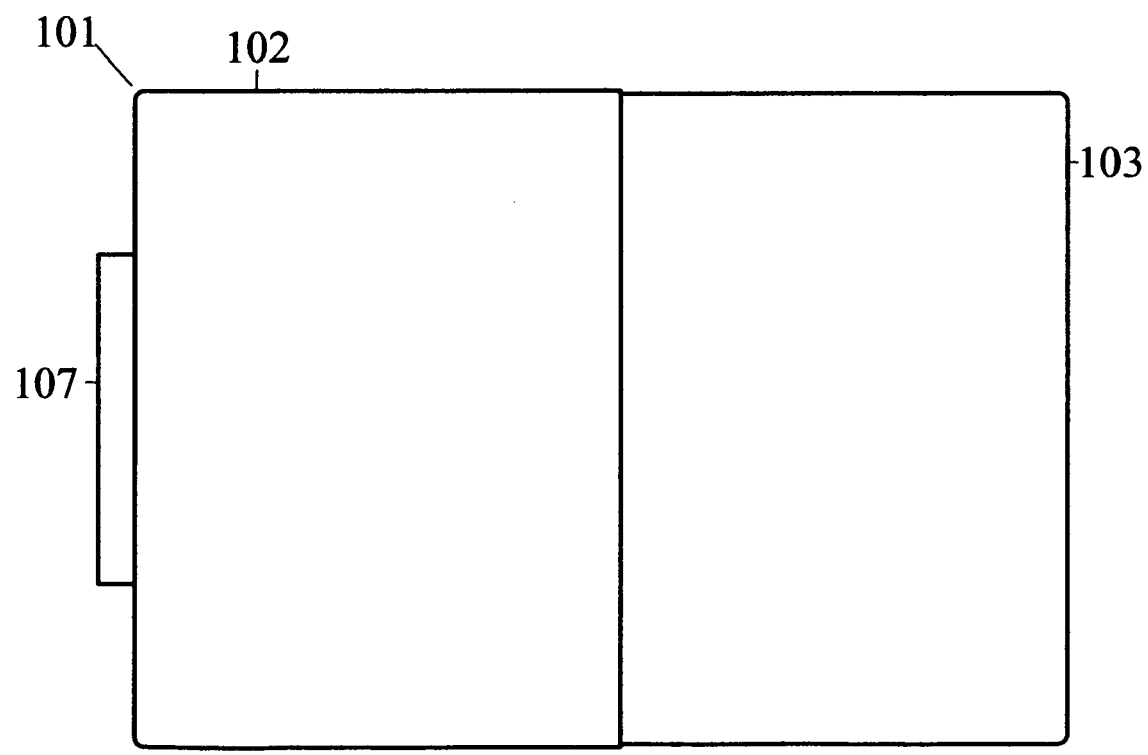

With reference now to FIGS. 28 through 32, one embodiment of a carrier 101 will be described in which a cowling 107 and a security gate 108 are located on the side of the outer shell 102. The security gate 108 covers an access opening 137 (see FIG. 31), which is of sufficient size to facilitate ingress/egress of an animal when the carrier is either in a collapsed, an intermediary, or an expanded configuration. This embodiment does not require co-positioned openings of the outer shell 102 and the inner shell 103 (e.g., openings 105, 106 discussed in conjunction with embodiments 1 through 4). FIG. 28 conceptually depicts this embodiment in a collapsed configuration (FIG. 28A) and an expanded configuration (FIG. 28B). From this, it should be appreciated that the carrier 101 is adaptable to be configured from a collapsed configuration where the carrier footprint is relatively rectangular to an expanded configuration where the carrier footprint is squarer or is rectangular in a different dimension.

Figure 29:
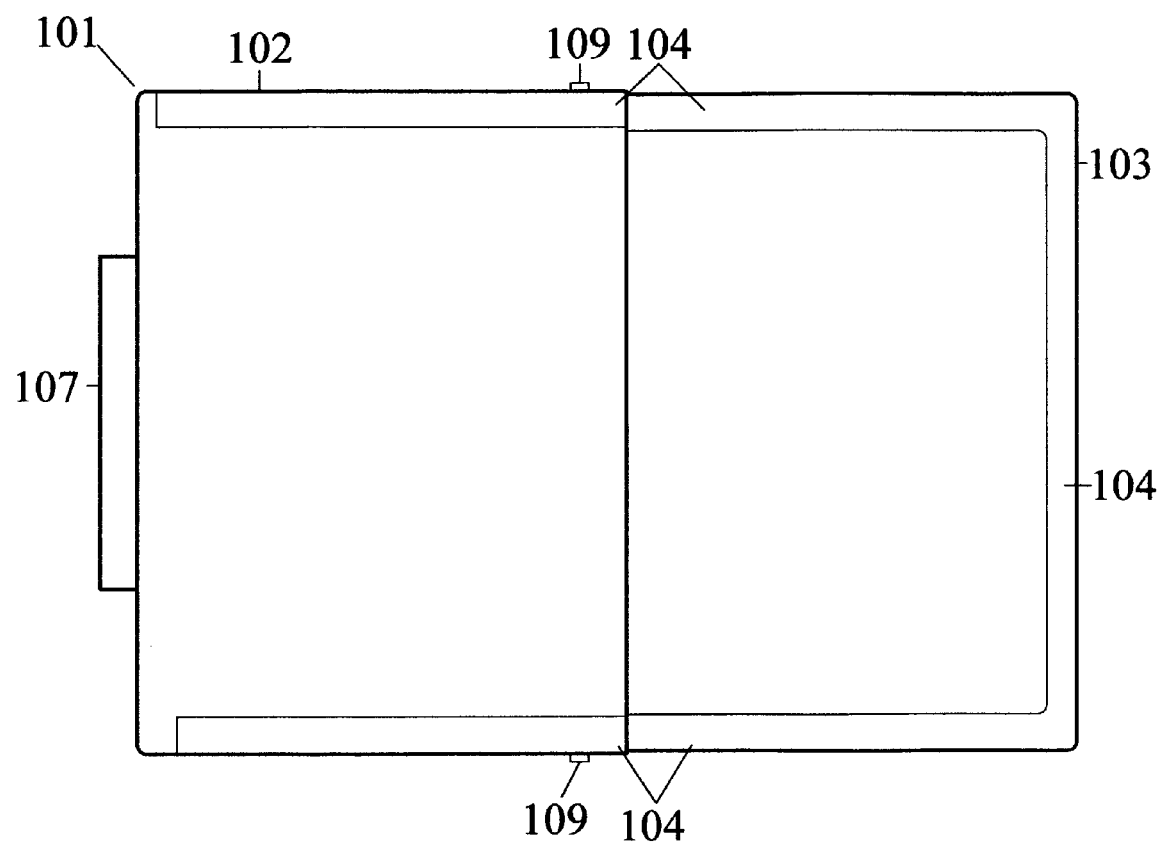
FIG. 29 is a simplified diagram of a top view of one embodiment of a carrier in an expanded configuration.
Figure 30:
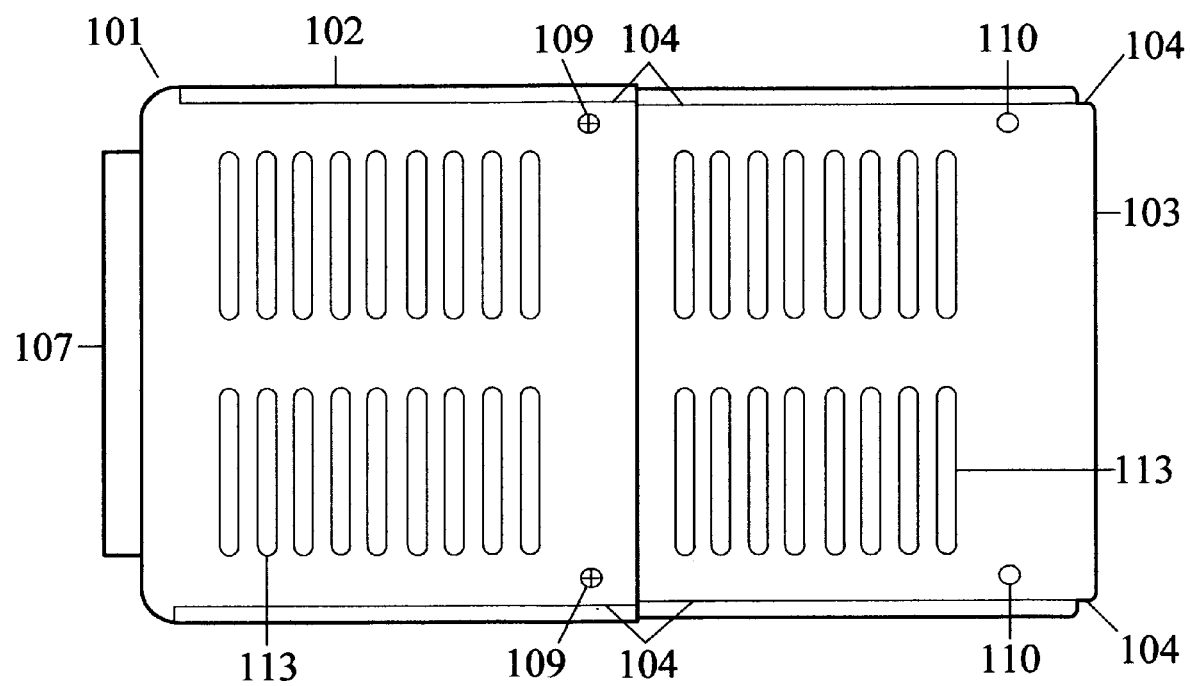
FIG. 30 is a simplified diagram of a front/rear view of one embodiment of a carrier in an expanded configuration.
Figure 31:
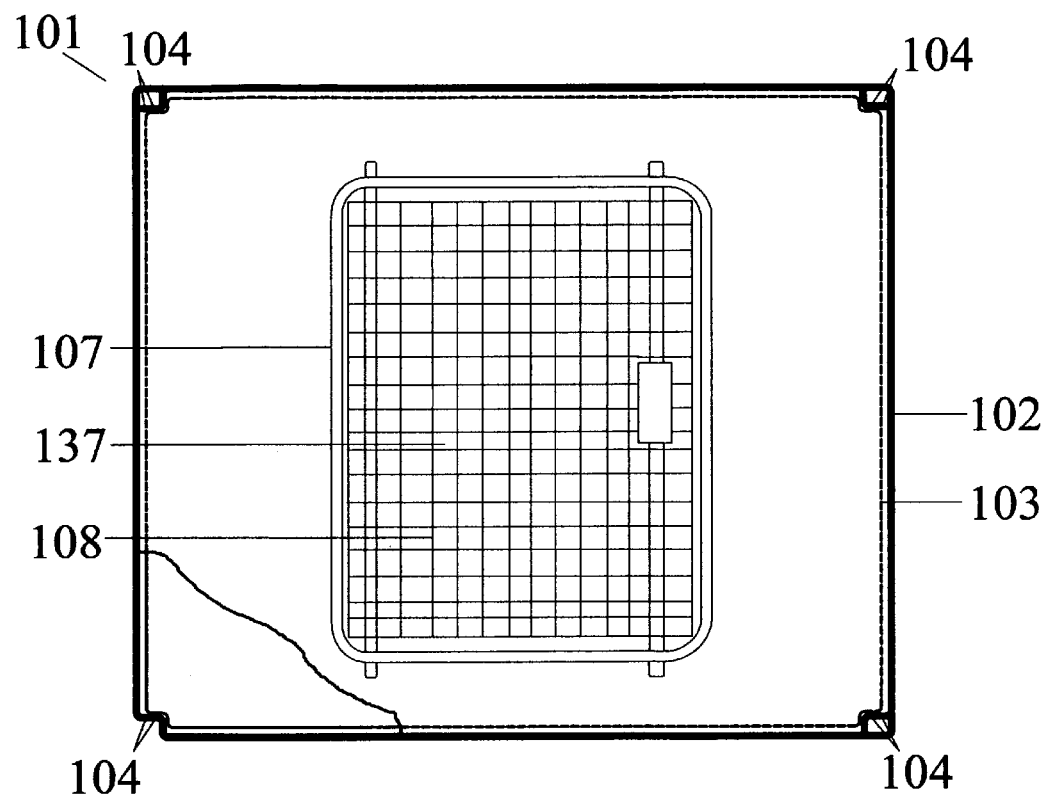
FIG. 31 is a simplified diagram of a side view of one embodiment of a carrier from a perspective of a side of a non-expanding side (e.g., an outer shell), with a cut-out section in the lower left hand corner of the graphic.
Figure 32:
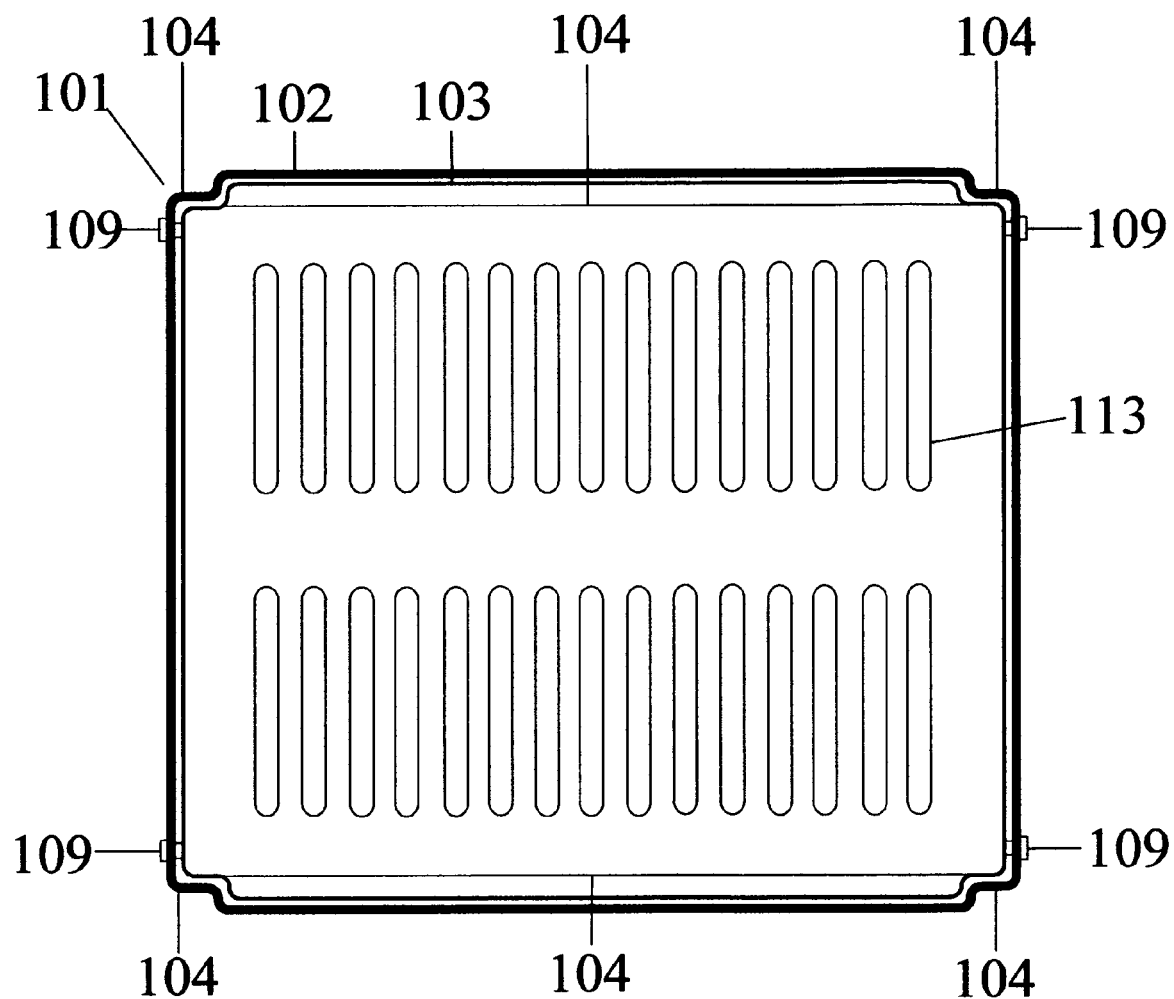
FIG. 32 is a simplified diagram of a side view of one embodiment of a carrier from a perspective of an expanding side (e.g., an inner shell).

FIGS. 29-32 illustrate various views of the embodiment of FIG. 28. FIG. 29 depicts the carrier 101 of FIG. 28 from a vertical perspective. FIG. 30 depicts the carrier 101 from the front and back perspectives. FIG. 31 depicts the carrier 101 from the non-expanding side perspective (outer shell 102) with a cut-out section, for clarity. FIG. 32 depicts the carrier 101 from the expanding side perspective (inner shell 103).

As with previous embodiments 1 through 4, locks 109, and stops 111 and 112 located in the front and rear structural shoulders 104 of shells 102 and 103 may prevent the front and rear portions of the inner shell 103 from exiting the front and rear portions of the outer shell 102 when the carrier is in an expanded configuration.

Additionally, the front and back surfaces of both shells 102 and 103 of this embodiment, and the side surface of the inner shell 103 of this embodiment may contain any type, number or arrangement of ventilators 113 (not necessarily the type, number, and location shown). When the carrier is in a collapsed configuration, the ventilators of the shells, if incorporated into the carrier, may be co-positioned such that air-flow restriction is minimized between overlapping surfaces.

It should be appreciated that a carrier as taught herein may be implemented in a variety of configurations. For example, a carrier may be constructed to expand either to the right or the left. In addition, in view of the teachings herein it should be appreciated that a variety of mechanisms other than those specifically shown may be used to provide a moving member and to couple the moving member to the carrier.

It also should be appreciated that a carrier as taught herein may be constructed using a variety of techniques, components and materials. For example, the carrier and any of the components such as a security gate, internal swinging wall, sliding articulated wall, side-mounted roll-up articulated wall, center-mounted roll-up articulated wall, locks, or components of these items, may be made of a plastic material, a metallic material, a composite material, a wood, some other material, or any combination of these materials.

While certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. It will thus be recognized that various modifications may be made to the illustrated and other embodiments of the invention described above, without departing from the broad inventive scope thereof. In view of the above it will be understood that the invention is not limited to the particular embodiments or arrangement disclosed, but is rather intended to cover any changes, adaptations or modifications which are within the scope and spirit of the invention.

What is claimed is:

1. An expandable animal carrier comprising:
   an outer shell defining a first opening;
   an inner shell defining a second opening, the inner shell configured to be at least partially slidably containable within the outer shell; and
   a movable member coupled to the inner shell and configurable to block at least a portion of the second opening when the inner shell is at least partially withdrawn from the outer shell wherein the moveable member comprises a wall having a first end coupled to slide relative to the inner shell and a second end coupled to a stationary member of the outer shell.

2. The carrier of claim 1 wherein the wall is slidably coupled to a slot of the inner shell.

3. The carrier of claim 1 wherein the wall is rotatably coupled to the outer shell.

4. The carrier of claim 1 wherein the wall is slidably coupled to a groove of the inner shell.

5. The carrier of claim 1 wherein the moveable member is configured to roll-up along an axis.

6. The carrier of claim 5 wherein the axis is rotatably coupled to the inner shell.

7. The carrier of claim 5 wherein the axis is rotatably coupled to the outer shell.

8. The carrier of claim 5 wherein the moveable member comprises an articulated wall.

9. The carrier of claim 8 wherein the articulated wall comprises interconnected lobed members.

10. An expandable animal carrier comprising:

an outer shell defining a first opening;

an inner shell configured to be at least partially slidably containable within the outer shell such that the inner and outer shells are configurable to define a collapsed configuration and an expanded configuration, the inner shell defining a second opening configured to be co-positioned with the first opening in the collapsed configuration; and a movable member coupled to the inner shell and configured to move relative to the inner shell from a first position associated with the collapsed configuration to a second position associated with the expanded configuration, wherein at the second position the movable member is configured to block at least a portion of the second opening wherein the moveable member comprises a wall having a first end coupled to slide relative to the inner shell and a second end coupled to a stationary member of the outer shell.

11. The carrier of claim 10 wherein the second end is rotatably coupled to the outer shell.

12. The carrier of claim 11 wherein the first end comprises an axis slidably coupled to a slot of the inner shell.

13. The carrier of claim 10 wherein the moveable member comprises an articulated wall.

14. The carrier of claim 13 wherein the articulated wall comprises a first end member configured to be coupled to the stationary member of the outer shell.

15. The carrier of claim 14 wherein the articulated wall comprises a second end member configured to slide within a guide of the inner shell.

16. The carrier of claim 10 comprising a roll-up mechanism configured to roll-up the moveable member along an axis.

17. The carrier of claim 16 wherein the axis is rotatably coupled to the inner shell.

18. The carrier of claim 16 wherein the axis is rotatably coupled to the outer shell.

19. The carrier of claim 16 wherein the moveable member comprises an articulated wall comprising interconnected lobed members.

* * * * *